US010399468B2

(12) United States Patent
Gale et al.

(10) Patent No.: US 10,399,468 B2
(45) Date of Patent: Sep. 3, 2019

(54) OCCUPANT RESTRAINT ACTUATED APPARATUS FOR DYNAMICALLY STIFFENING A MOTOR VEHICLE SEAT BACK

(71) Applicant: Indiana Mills & Manufacturing, Inc., Westfield, IN (US)

(72) Inventors: Steven Gale, Colfax, IN (US); John G. Glover, Danville, IN (US); Guy R. Dingman, Westfield, IN (US); Douglas W. Bittner, Indianapolis, IN (US); Jacob C. White, Noblesville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 546 days.

(21) Appl. No.: 15/217,614

(22) Filed: Jul. 22, 2016

(65) Prior Publication Data
US 2017/0021748 A1 Jan. 26, 2017

Related U.S. Application Data

(60) Provisional application No. 62/195,628, filed on Jul. 22, 2015.

(51) Int. Cl.
*B60N 2/427* (2006.01)
*B60N 2/433* (2006.01)
(Continued)

(52) U.S. Cl.
CPC ....... *B60N 2/4279* (2013.01); *B60N 2/42709* (2013.01); *B60N 2/42772* (2013.01);
(Continued)

(58) Field of Classification Search
CPC .............. B60N 2/4279; B60N 2/42709; B60N 2/42772; B60N 2/433; B60R 22/20; B60R 22/18; B60R 22/26; B60R 22/28
See application file for complete search history.

(56) References Cited

U.S. PATENT DOCUMENTS

2002/0063466 A1 5/2002 Vits et al.
2004/0051356 A1* 3/2004 Neelis .................. B60N 2/2809
297/253
(Continued)

FOREIGN PATENT DOCUMENTS

WO 2011112462 A1 9/2011

OTHER PUBLICATIONS

Search Report and Written Opinion for International Patent Application No. PCT/US2016/043643; dated Nov. 3, 2016.

*Primary Examiner* — Anthony D Barfield
(74) *Attorney, Agent, or Firm* — Barnes & Thornburg LLP

(57) ABSTRACT

An apparatus for dynamically stiffening a vehicle seat back may include a vehicle seat including a seat bottom mountable within a vehicle, a seat back extending upwardly away from the seat bottom, and a bight defined at a forward-facing interface between the seat bottom and the seat back, an occupant restraint harness coupled to the vehicle seat and engaging a top end of the seat back, and a seat back stiffening apparatus having a seat back stiffening member and an actuator coupled to the occupant restraint harness adjacent to or near the bight of the vehicle seat. The actuator may be responsive to a first force applied thereto by the occupant restraint harness in excess of a first threshold force to deploy the seat back stiffening member to couple to and between the seat bottom and the seat back to add stiffness to the seat back frame.

20 Claims, 16 Drawing Sheets

(51) Int. Cl.
*B60R 22/00* (2006.01)
*B60R 22/18* (2006.01)
*B60R 22/26* (2006.01)
*B60R 22/28* (2006.01)

(52) U.S. Cl.
CPC .............. *B60N 2/433* (2013.01); *B60R 22/00* (2013.01); *B60R 22/18* (2013.01); *B60R 22/26* (2013.01); *B60R 22/28* (2013.01); *B60R 2022/1806* (2013.01)

(56) References Cited

U.S. PATENT DOCUMENTS

2009/0121533 A1 5/2009 Kalina et al.
2010/0327644 A1 12/2010 Lamparter et al.

\* cited by examiner

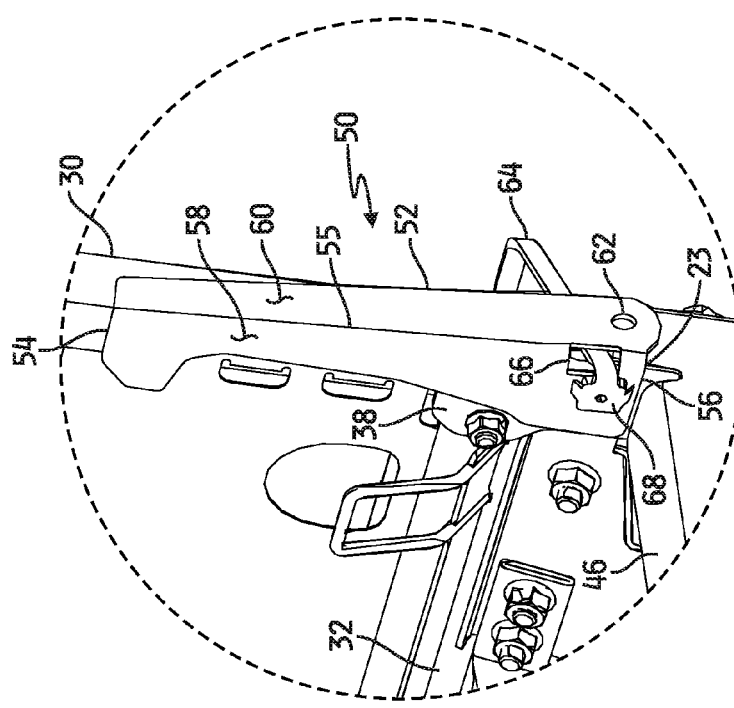
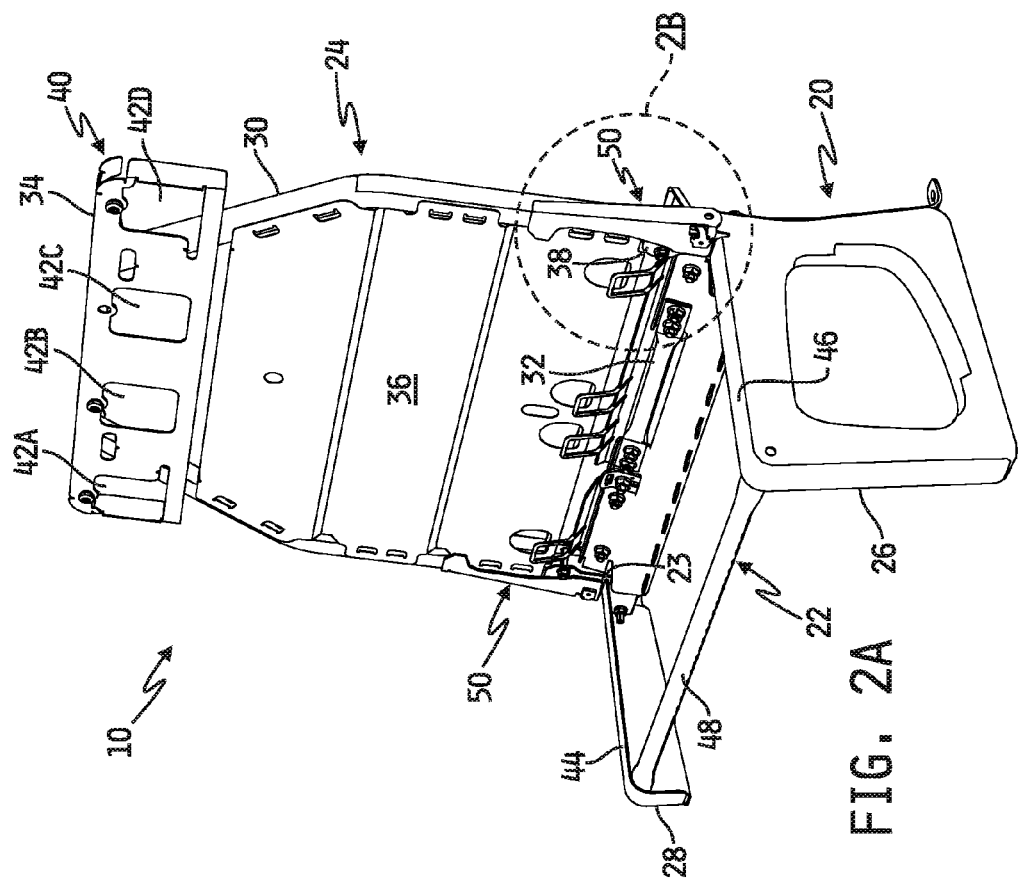
FIG. 2A
FIG. 2B

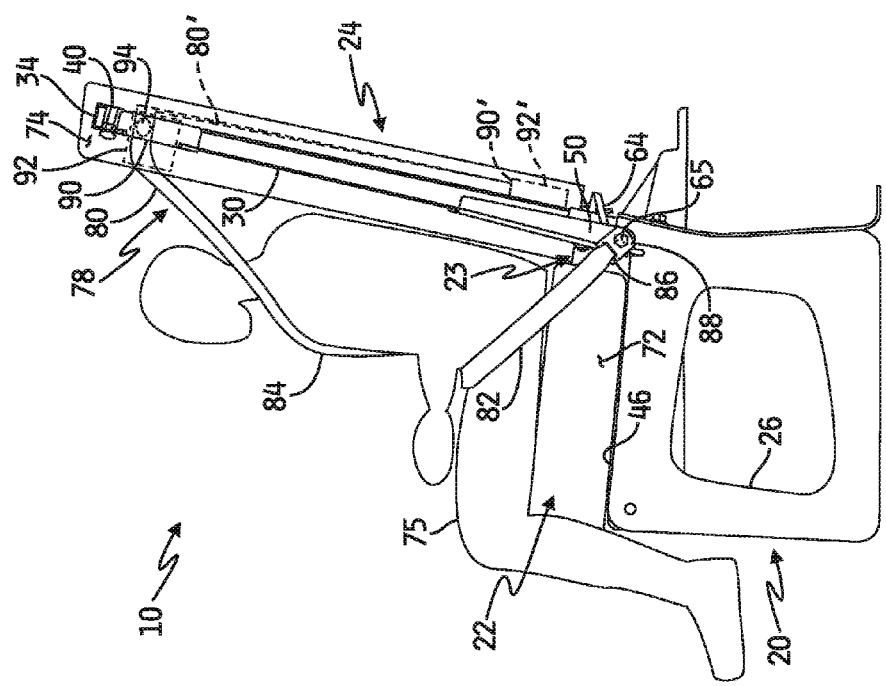
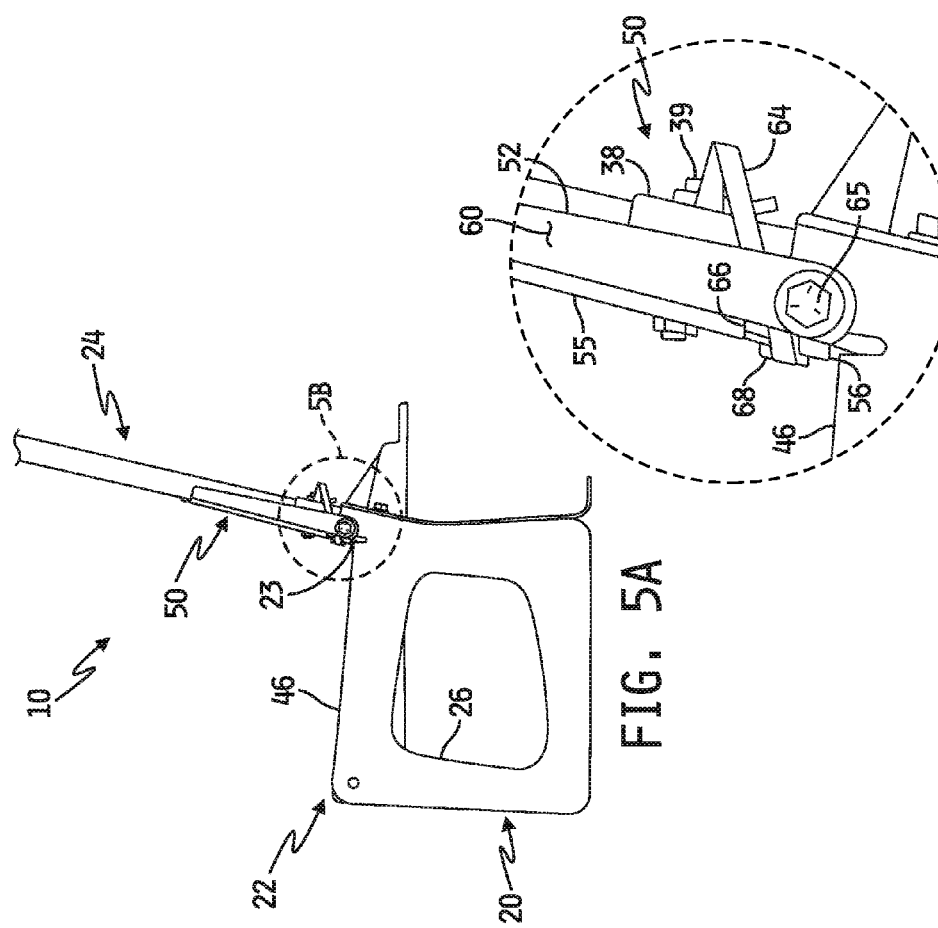

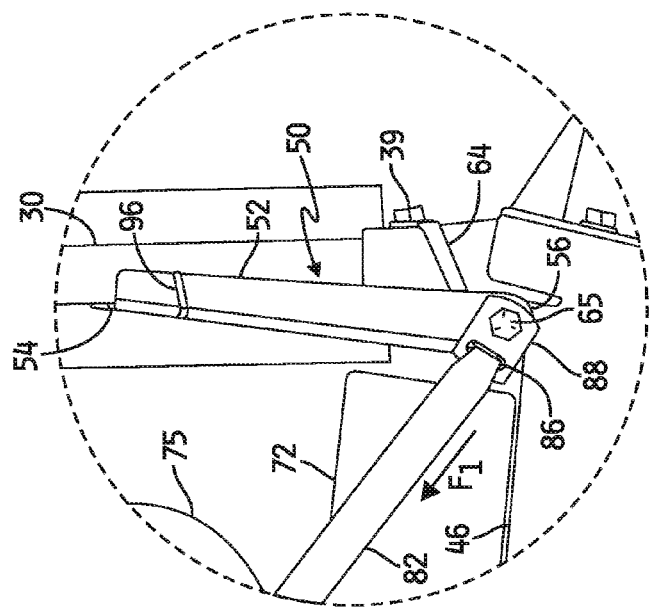
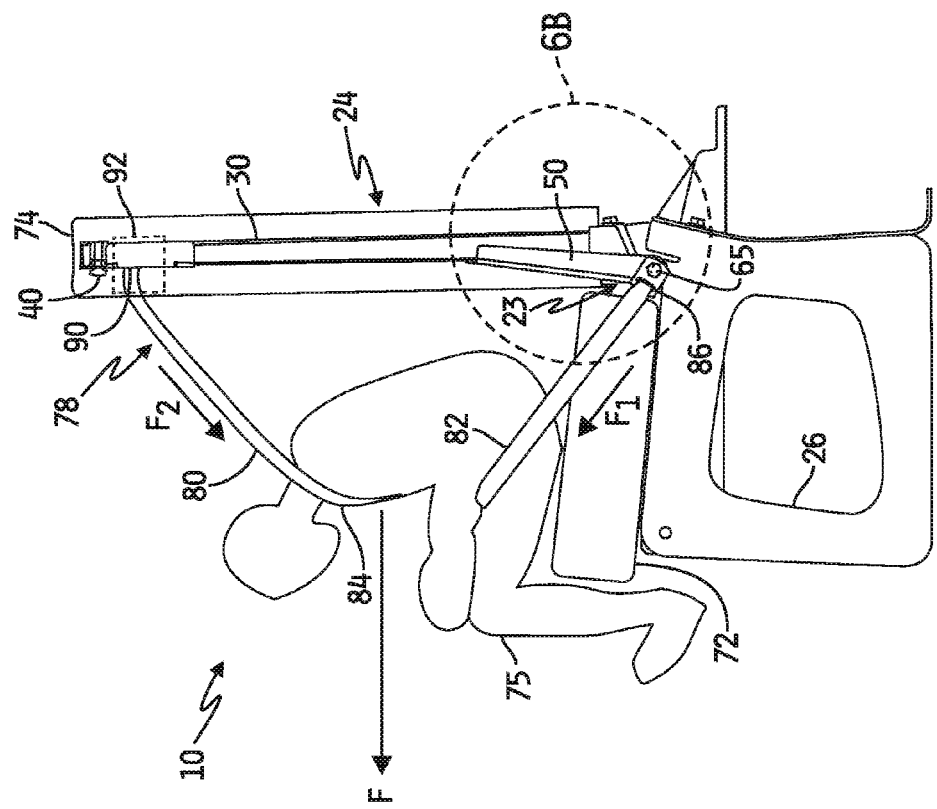

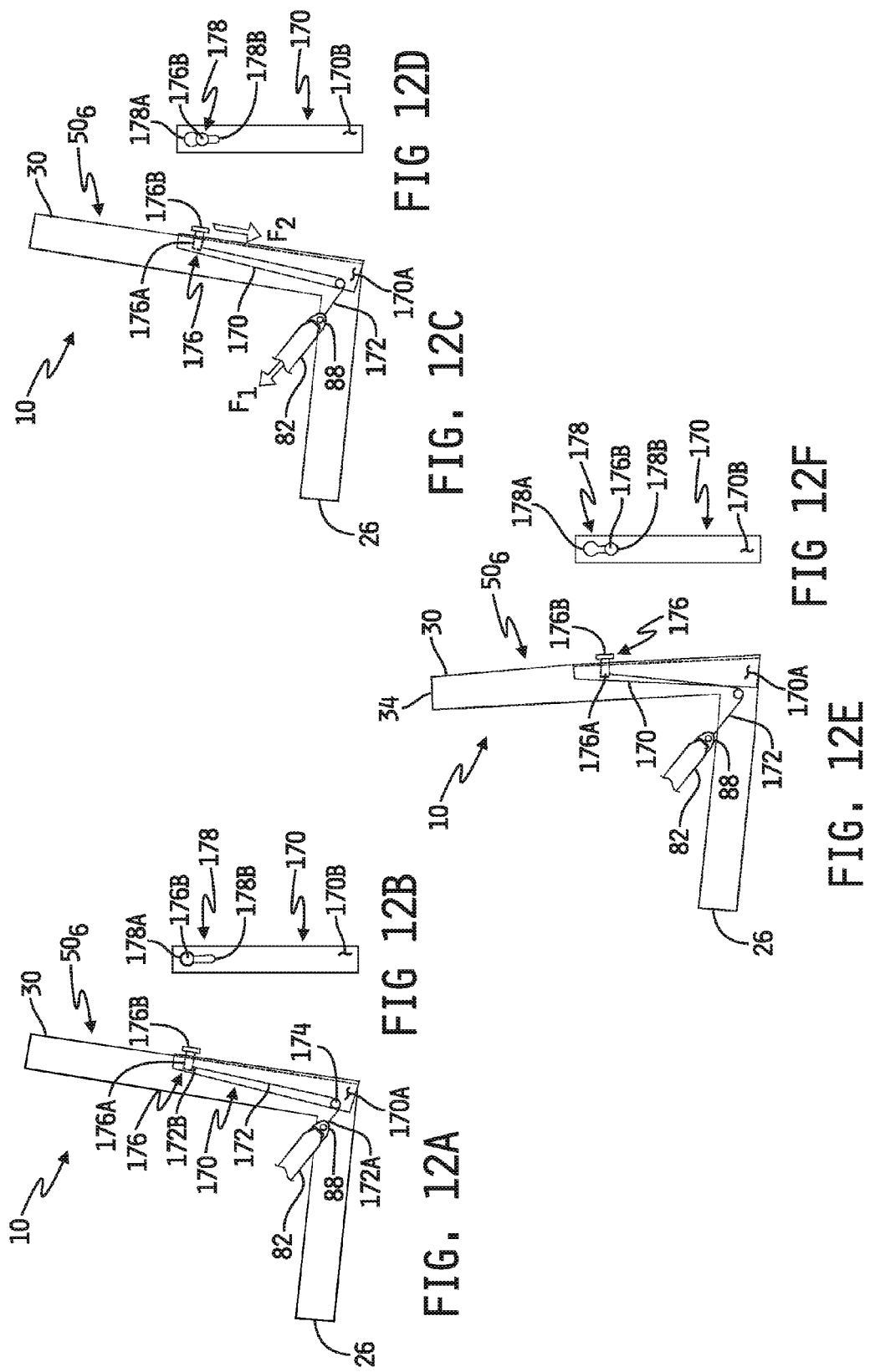

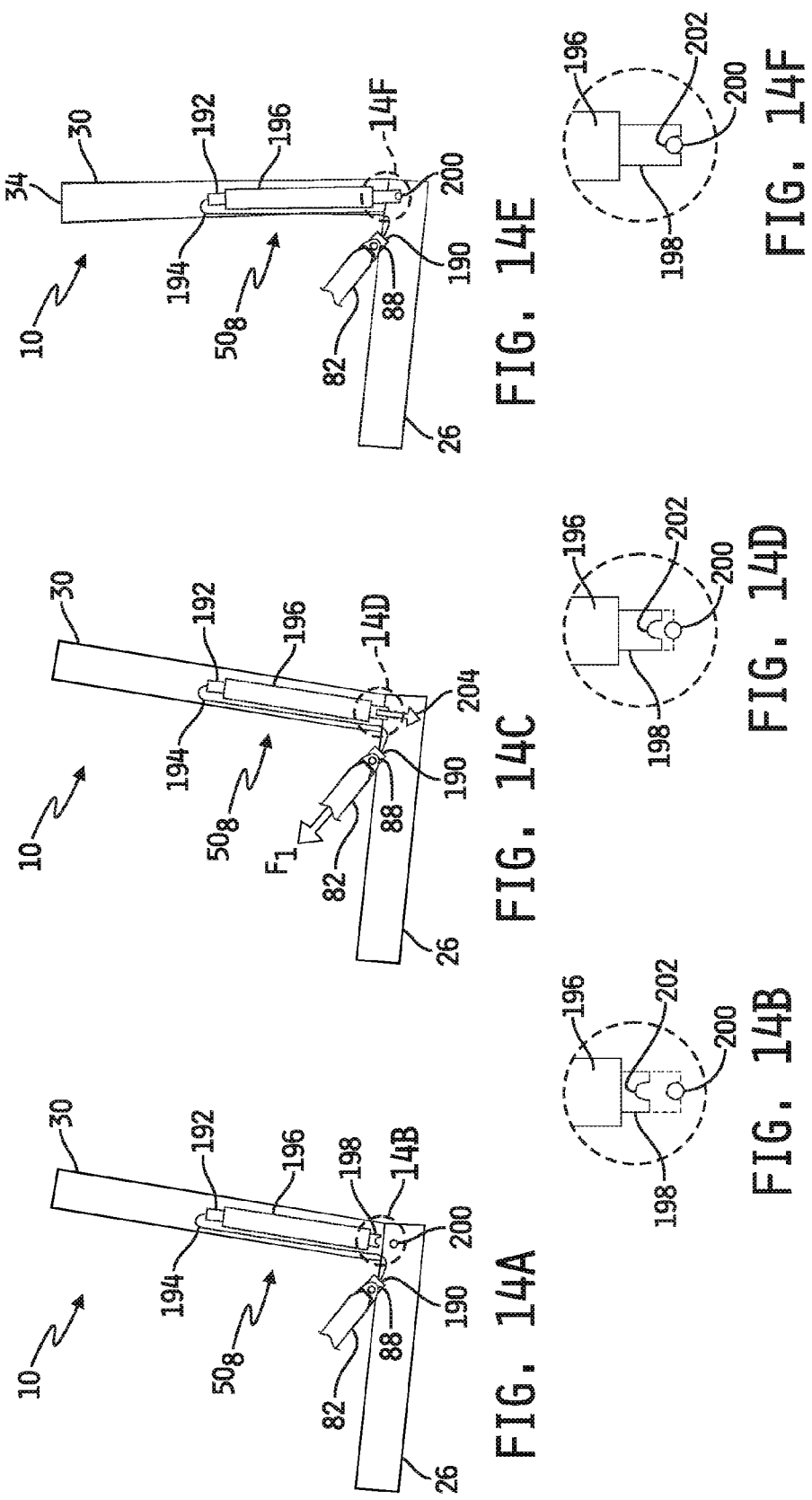

OCCUPANT RESTRAINT ACTUATED APPARATUS FOR DYNAMICALLY STIFFENING A MOTOR VEHICLE SEAT BACK

CROSS-REFERENCE TO RELATED U.S. APPLICATION

This application claims the benefit of, and priority to, U.S. Patent Application No. 62/195,628, filed Jul. 22, 2015, the disclosure of which is incorporated herein by reference in its entirety.

FIELD OF THE INVENTION

The present invention relates generally to seats for motor vehicles, and more specifically to apparatuses for dynamically stiffening motor vehicle seat backs in response to loads applied to occupant restraint systems coupled to such seats.

BACKGROUND

In some moving vehicles, forces may be applied during a rapid deceleration event, e.g., a vehicle crash event, to a backside of a vehicle seat back by one or more occupants of a rearwardly positioned vehicle seat, and such seat backs are typically designed to deform forwardly under such conditions. However, some such vehicle seats may further include one or more conventional restraint systems mounted thereto, and during such rapid deceleration events additional forces applied by one or more such restraint systems to the seat back at or near the top thereof may cause additional forward deformation of the seat back. It is desirable in some restraint system implementations to limit such forward deformation.

SUMMARY

The present invention may comprise one or more of the features recited in the attached claims, and/or one or more of the following features and combinations thereof. In a first example aspect, an apparatus for dynamically stiffening a vehicle seat back may comprise a vehicle seat including a seat bottom mountable within a vehicle, a seat back extending upwardly away from the seat bottom, and a bight defined at a forward-facing interface between the seat bottom and the seat back, an occupant restraint harness coupled to the vehicle seat and engaging a top end of the seat back, the occupant restraint harness configured to restrain an occupant of the vehicle seat, and a seat back stiffening apparatus having a seat back stiffening member and an actuator coupled to the occupant restraint harness adjacent to or near the bight of the vehicle seat, the actuator responsive to a first force applied thereto by the occupant restraint harness in excess of a first threshold force to deploy the seat back stiffening member to couple to and between the seat bottom and the seat back to add stiffness to the seat back frame.

A second example aspect includes the subject matter of the first aspect, and wherein the seat back comprises a seat back frame supporting the seat back, and the seat back stiffening member comprises an elongated bracket having a first end and a second end opposite the first end, the elongated bracket mounted to one of the seat back frame and the seat bottom at or near the first end thereof with the second end of the bracket normally positioned adjacent to the seat back frame, and wherein the elongated bracket at or near the second end thereof defines the actuator and is coupled to the occupant restraint harness, the first force in excess of the first threshold force applied by the occupant restraint harness to the bracket at or near the second end thereof drawing the second end of the bracket forwardly away from the seat back frame, and wherein a second force in excess of a second threshold force applied by the occupant restraint harness to the top end of the seat back deforms the seat back frame and forces the second end of the bracket into contact with the other of the seat back and the seat bottom.

A third example aspect includes the subject matter of the second aspect and may further comprise a travel stop member to stop outward movement of the second end of the elongated bracket away from the seat back frame, in response to the first force in excess of the first threshold force applied thereto by the occupant restraint harness, after the second end of the elongated bracket is spaced apart from the seat back frame.

A fourth example aspect includes the subject matter of the third aspect and wherein the travel stop member comprises a control arm having a first end coupled to the elongated bracket at or near the second end thereof and a second end coupled to the seat back frame, the control arm extending from a first position with the second end of the elongated bracket positioned adjacent to the seat back frame to a second position with the second end of the bracket spaced apart from the seat back frame.

A fifth example aspect includes the subject matter of the fourth example aspect and wherein the control arm deforms between the first and second positions thereof in response to the first force in excess of the first threshold force applied by the occupant restraint harness to the elongated bracket at or near the second end thereof.

A sixth example aspect includes the subject matter of any of the first through third example aspects and wherein the travel stop member comprises a notch defined in a forwardly-facing surface of the elongated bracket between the first and second ends thereof, the outward movement of the second end of the elongated bracket away from the seat back frame stopping as the notch closes in response to outward movement of the bracket.

A seventh example aspect includes the subject matter of the sixth example aspect and the elongated bracket deforms to close as the second end of the elongated bracket moves outwardly away from the seat back frame in response to the first force in excess of the first threshold force applied by the occupant restraint harness to the elongated bracket at or near the second end thereof.

An eighth example aspect includes the subject matter of any of the third through eighth example aspects and wherein the travel stop member comprises a shaft extending along or through the seat back frame, the shaft having a first end coupled to the elongated bracket at or near the second end thereof and a second end defining a head, the shaft extending from a first position with the second end of the elongated bracket positioned adjacent to the seat back frame and the head of the shaft spaced apart from the seat back frame to a second position with the second end of the bracket spaced apart from the seat back frame and the head of the shaft in contact with the seat back frame.

A ninth example aspect includes the subject matter of the eighth example aspect and may further comprise a spring disposed between the head of the shaft and the seat back frame.

A tenth example aspect includes the subject matter of the first example aspect and wherein the seat back comprises a seat back frame supporting the seat back, and the seat back stiffening member comprises an elongated bracket having a first end and a second end opposite the first end, the elongated bracket mounted to one of the seat bottom and the seat back frame at or near the first end of the bracket with the second end of the bracket positioned adjacent to the seat back frame, the elongated bracket defining a linear guide slot therethrough at or near the second end thereof, the linear guide slot defining an enlarged opening transitioning to a reduced width portion, and wherein the actuator comprises a headed shaft movably mounted to the other of the seat bottom and the seat back frame, the headed shaft having a shaft portion coupled to the occupant restraint harness and sized to pass through both the enlarged opening and the reduced width portion of the guide slot and a head portion sized to pass through the enlarged opening but not through the reduced width portion of the guide slot, the head portion of the headed shaft normally extending through the enlarged opening of the guide slot, the first force in excess of the first threshold force applied by the occupant restraint harness to the shaft portion of the headed shaft drawing the head portion into the reduced width portion of the guide slot to thereby couple the elongated bracket to and between the seat bottom and the seat back frame.

An eleventh example aspect includes the subject matter of the first example aspect and wherein the seat back comprises a seat back frame supporting the seat back, and the seat back stiffening member comprises an elongated flexible member having a first end coupled to a rearwardly facing portion of the seat back frame and a second end opposite the first end defining the actuator coupled to the occupant restraint harness, and wherein the seat back stiffening apparatus further comprises a bracket mounted to the seat bottom in contact with the flexible member between the first and second ends thereof, the elongated flexible member sized to be normally slack between the first and second ends thereof, the first force in excess of the first threshold force applied by the occupant restraint harness to the first end of the elongated flexible member drawing the elongated flexible member taught between the seat back frame and the bracket to thereby add stiffness to the seat back.

A twelfth example aspect includes the subject matter of the first example aspect and wherein the seat back comprises a seat back frame supporting the seat back, and the seat back stiffening member comprises an elongated flexible member having a first end coupled to a rearwardly facing portion of the seat back frame and a second end opposite the first end coupled to the seat bottom, and wherein the actuator comprises an elongated bracket having a first end and a second end opposite the first end, the occupant restraint harness coupled to the elongated bracket at or near the first end thereof and the second end of the elongated bracket in contact with the flexible member between the first and second ends thereof the elongated bracket pivotably mounted between the first and second ends thereof to the seat back frame or the seat bottom, the elongated flexible member sized to be normally slack between the first and second ends thereof, the first force in excess of the first threshold force applied by the occupant restraint harness to the elongated bracket at or near the first end thereof pivoting the elongated bracket to force the second end of the elongated bracket into the elongated flexible member to drawn the elongated flexible member taught between the seat back frame and the seat bottom to thereby add stiffness to the seat back.

A thirteenth example aspect includes the subject matter of the first example aspect and wherein the seat back comprises a seat back frame supporting the seat back, and the seat back stiffening member comprises an elongated bracket having a first end and a second end opposite the first end, the elongated bracket pivotably mounted to the seat back frame or the seat bottom between first and second ends thereof with the first end of the bracket normally spaced apart forwardly away from the seat back frame, and wherein the elongated bracket at or near the second end thereof defines the actuator and is coupled to the occupant restraint harness, the first force in excess of the first threshold force applied by the occupant restraint harness to the bracket at or near the second end thereof pivoting the elongated bracket to force the first end of the elongated bracket rearwardly into contact with the seat back frame to thereby add stiffness to the seat back.

A fourteenth example aspect includes the subject matter of the first example aspect and wherein the seat back comprises a seat back frame supporting the seat back, and the seat bottom is slidably mounted to a seat mounting base mountable within the vehicle, and wherein the seat back stiffening member comprises a first elongated bracket slidably mounted to one of the seat back frame and the seat bottom, and a pin coupled to the other of the seat back frame and the seat bottom, one end of the first elongated bracket facing the pin and defining a notch sized to receive the pin therein, and wherein the actuator comprises a second elongated bracket having a first end pivotably mounted to the seat bottom and a second end, opposite the first end, pivotably mounted to the first elongated bracket, the second elongated bracket coupled between the first and second ends thereof to the occupant restraint harness, the first force in excess of the first threshold force applied by the occupant restraint harness to the second elongated bracket to draw the seat bottom forwardly relative to the seat mounting base thereby pivoting the first elongated bracket to force the notch defined in the one end of the first elongated bracket into engagement with the pin to thereby couple the first elongated bracket to and between the seat back frame and the seat bottom to thereby add stiffness to the seat back.

A fifteenth example aspect includes the subject matter of the first example aspect and wherein the seat back comprises a seat back frame supporting the seat back, and the seat back stiffening member comprises a chamber mounted to one of the seat back frame and the seat bottom, and a pin coupled to the other of the seat back frame and the seat bottom, the chamber carrying a movable piston having an exposed end defining a notch sized to receive the pin therein, and wherein the actuator comprises a force sensor coupled to the occupant restraint harness and a piston actuator communicatively coupled to the force sensor, the force sensor responsive to the first force in excess of the first threshold force applied thereto by the occupant restraint harness to activate the piston actuator to cause the piston to extend from the chamber and engage the notch with the pin to thereby couple the chamber and piston carried by the chamber to and between the seat back frame and the seat bottom to thereby add stiffness to the seat back.

A sixteenth example aspect includes the first example aspect and wherein the seat back comprises a seat back frame supporting the seat back, and the seat back stiffening member comprises a chamber mounted to one of the seat back frame and the seat bottom, and a bore defined in the other of the seat back frame and the seat bottom, the chamber carrying a movable piston having an exposed aligned with the bore, and wherein the actuator comprises a force sensor coupled to the occupant restraint harness and a piston actuator communicatively coupled to the force sensor, the force sensor responsive to the first force in excess of the first threshold force applied thereto by the occupant restraint harness to activate the piston actuator to cause the piston to extend from the chamber and into the bore to thereby couple the chamber and piston carried by the chamber to and between the seat back frame and the seat bottom to thereby add stiffness to the seat back.

In a seventeenth example aspect, an apparatus for dynamically stiffening a vehicle seat back may comprise a vehicle seat including a seat bottom mountable within a vehicle and a seat back extending upwardly away from the seat bottom, the seat back including a seat back frame supporting the seat back, an occupant restraint harness coupled to the vehicle seat and engaging a top end of the seat back, the occupant restraint harness configured to restrain an occupant of the vehicle seat, and an elongated bracket having a first end and a second end opposite the first end, the elongated bracket mounted to one of the seat back frame and the seat bottom at or near the first end thereof with the second end of the bracket normally positioned adjacent to the seat back frame, the occupant restraint harness coupled to the elongated bracket at or near the second end thereof, wherein a first force in excess of the first threshold force applied by the occupant restraint harness to the bracket at or near the second end thereof draws the second end of the bracket forwardly away from the seat back frame, and a second force in excess of a second threshold force applied by the occupant restraint harness to the top end of the seat back deforms the seat back frame to force the second end of the bracket into contact with the other of the seat back and the seat bottom to couple the elongated bracket to and between the seat bottom and the seat back and thereby add stiffness to the seat back frame.

An eighteenth example aspect includes the subject matter of the seventeenth example aspect and may further comprise a travel stop member to stop outward movement of the second end of the elongated bracket away from the seat back frame, in response to the first force in excess of the first threshold force applied thereto by the occupant restraint harness, after the second end of the elongated bracket is spaced apart from the seat back frame.

A nineteenth example aspect includes the subject matter of the eighteenth example aspect and wherein the travel stop member comprises a control arm having a first end coupled to the elongated bracket at or near the second end thereof and a second end coupled to one of the seat back frame and the seat bottom, the control arm extending from a first position with the second end of the elongated bracket positioned adjacent to the seat back frame to a second position with the second end of the bracket spaced apart from the seat back frame.

A twentieth example aspect includes the subject matter of the nineteenth example aspect and wherein the control arm deforms between the first and second positions thereof in response to the first force in excess of the first threshold force applied by the occupant restraint harness to the elongated bracket at or near the second end thereof.

BRIEF DESCRIPTION OF THE DRAWINGS

FIG. 2A is a simplified diagram of the vehicle seat of FIG. 1 shown in a different perspective view to illustrate features of the apparatus.

FIG. 2B is a magnified view of a portion of the vehicle seat illustrated in FIG. 2A to which the apparatus is mounted.

FIG. 5A is a simplified diagram of a side view of the vehicle seat of FIGS. 1-4.

FIG. 5B is a magnified view of a portion of the vehicle seat illustrated in FIG. 5A.

FIG. 5C is a simplified diagram of another side view of the vehicle seat illustrated in FIG. 5A and including occupant restraint components mounted to the seat.

FIG. 6A is a simplified diagram of another side view of the vehicle seat illustrated in FIG. 5C illustrating operation of the apparatus during a vehicle crash event.

FIG. 6B is a magnified view of a portion of the vehicle seat and apparatus illustrated in FIG. 6A.

FIG. 12A is a simplified side-view diagram of the vehicle seat illustrated in FIG. 1 including still a further embodiment of an occupant restraint actuated apparatus for dynamically stiffening the vehicle seat back.

FIG. 12B is a simplified rear view of some of the components of the apparatus illustrated in FIG. 12A.

FIG. 12C is another simplified side view diagram of the vehicle seat shown in FIG. 12A illustrating operation of the apparatus during a vehicle crash event.

FIG. 12D is another simplified rear view of the components of FIG. 12B illustrating operation of the components during the vehicle crash event as also illustrated in side view in FIG. 12C.

FIG. 12E is yet another simplified side view diagram of the vehicle seat of FIGS. 12A and 12C shown after completion of the crash event illustrated in FIGS. 12C and 12D.

FIG. 12F is yet another simplified rear view of the components of FIGS. 12B and 12D shown after completion of the crash event as also illustrated in side view in FIG. 12E.

FIG. 14A is a simplified side-view diagram of the vehicle seat illustrated in FIG. 1 including yet another embodiment of an occupant restraint actuated apparatus for dynamically stiffening the vehicle seat back.

FIG. 14B is a magnified side view of some of the components of the apparatus illustrated in FIG. 14A.

FIG. 14C is another simplified side view diagram of the vehicle seat shown in FIG. 14A illustrating operation of the apparatus during a vehicle crash event.

FIG. 14D is another magnified view of the components of FIG. 14B illustrating operation of the components during the vehicle crash event as also illustrated in side view in FIG. 14C.

FIG. 14E is yet another simplified side view diagram of the vehicle seat of FIGS. 14A and 14C shown after completion of the crash event illustrated in FIGS. 14C and 14D.

FIG. 14F is yet another magnified view of the component of FIGS. 14B and 14D shown after completion of the crash event as also illustrated in side view in FIG. 14E.

DESCRIPTION OF THE ILLUSTRATIVE EMBODIMENTS

Figure 1:
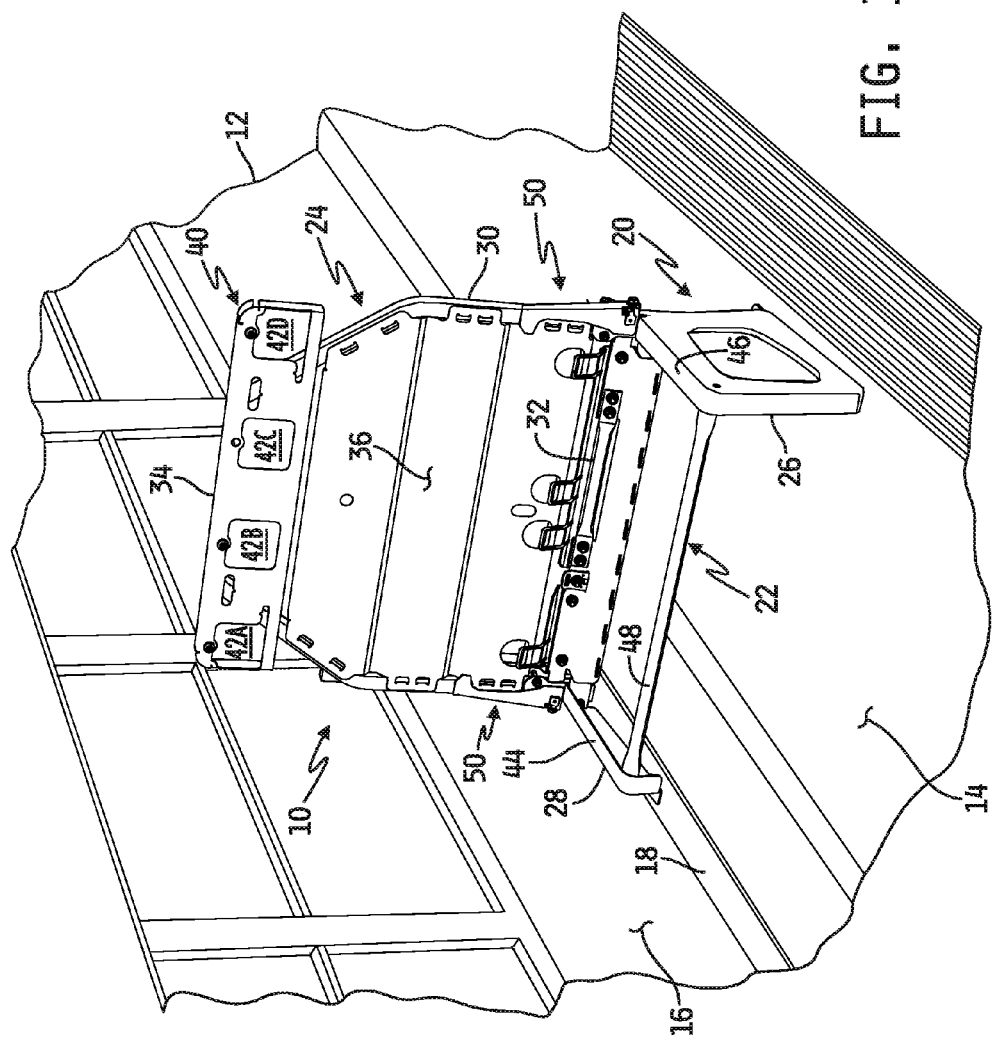
FIG. 1 is a simplified diagram of an embodiment of a vehicle seat mounted in a motor vehicle including an embodiment of an occupant restraint actuated apparatus for dynamically stiffening the vehicle seat back.
Figure 3:
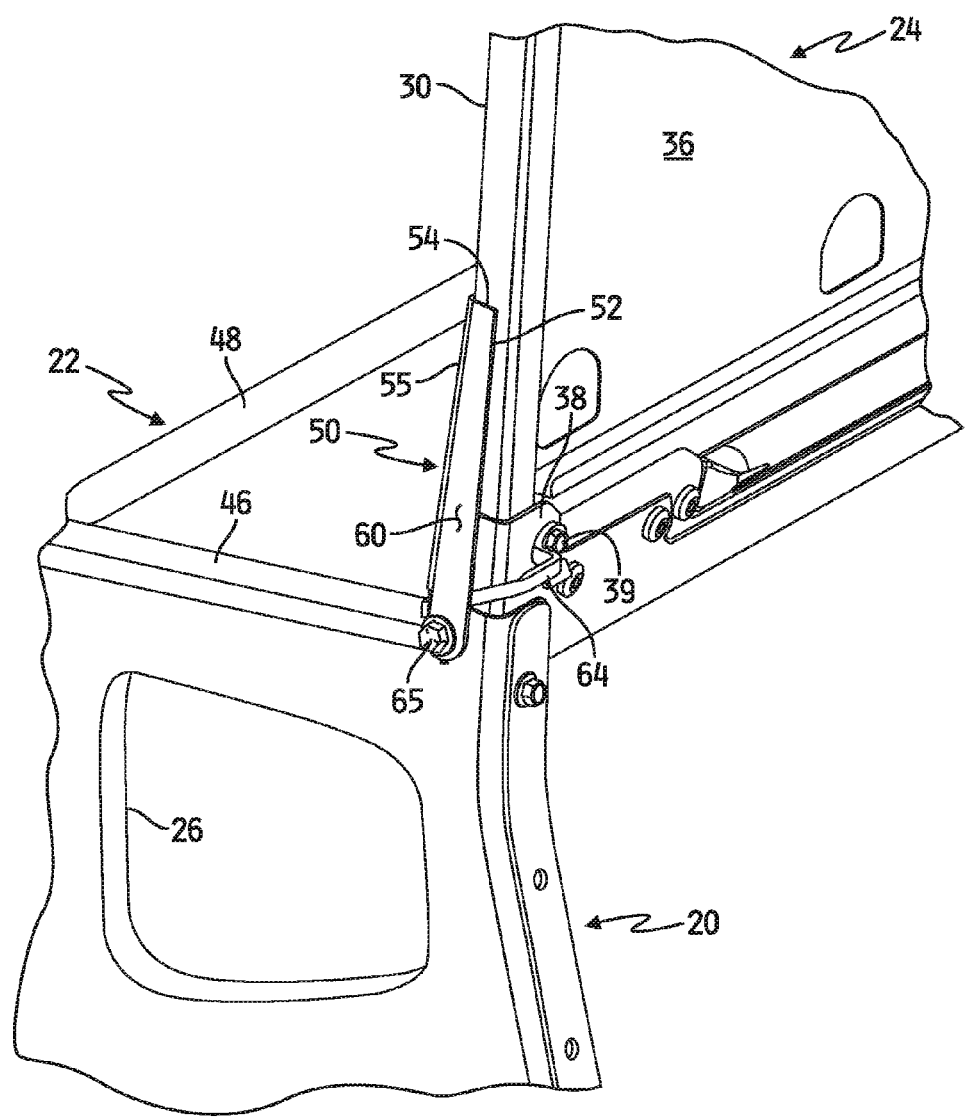
FIG. 3 is a simplified diagram of a rear perspective view of the vehicle seat of FIGS. 1-2B.
Figure 4:
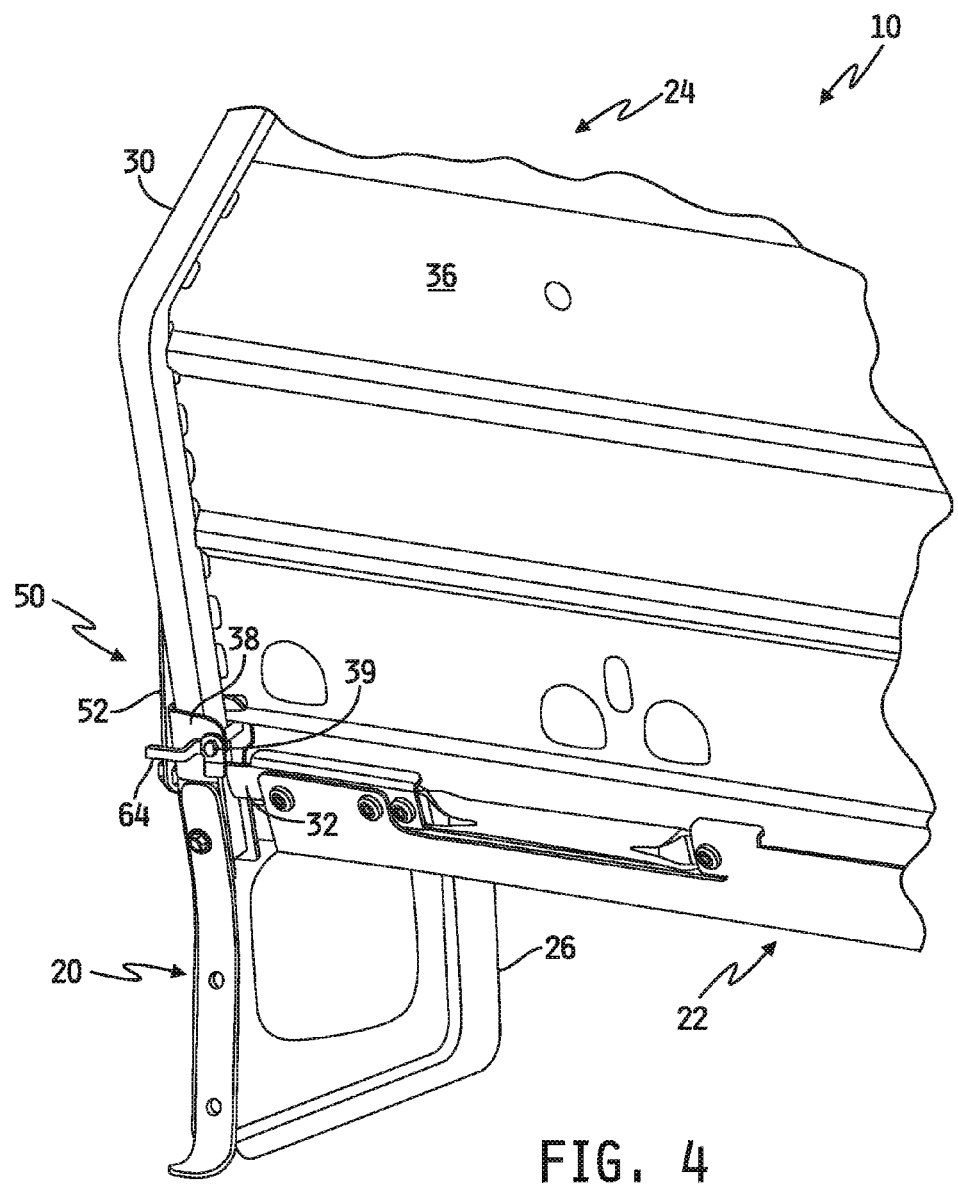
FIG. 4 is a simplified diagram of another rear perspective view of the vehicle seat of FIGS. 1-3.

For the purposes of promoting an understanding of the principles of the invention, reference will now be made to a number of illustrative embodiments shown in the attached drawings and specific language will be used to describe the same.

Referring now to FIGS. 1-5B, a simplified diagram is shown of one embodiment of a vehicle seat 10 mounted in a vehicle 12 and including some components of an embodiment of an occupant restraint actuated apparatus for dynamically stiffening the vehicle seat back. The vehicle 12 is a movable vehicle and may illustratively be or include any motor or non-motor commercial, non-commercial or recreational vehicle, examples of which may include, but are not limited to, an automobile, a light, mid or heavy duty truck, an emergency vehicle such as a fire truck, ambulance or the like, any type of bus such as a school bus, commercial bus, shuttle bus or the like, a van, a limousine of any type, a commercial or personal watercraft, a recreational vehicle an all-terrain vehicle (ATV), any type of off-road vehicle, electric vehicle of any type, and the like. In the illustrated embodiment, the vehicle seat 10 is implemented in a school bus 12, and will be described as such in this document, although it will be understood that the vehicle seat 10 may alternatively be implemented in any of the types of movable vehicles described in this paragraph.

In the illustrated embodiment, the school bus 12 is conventional and includes a floor 14 connected to a side wall 16 with a conventional seat mounting rail 18 attached thereto and extending therefrom. The vehicle seat 10 is illustratively provided in the form of a seat frame that is mountable to the school bus 12, and in the illustrated embodiment the seat frame includes a seat mounting base 20 which is mounted to, i.e., attached to, one or more structures of the school bus 12. The seat mounting base 20 illustratively includes, for example, a seat mounting base 26 attached to or integral with one side of the vehicle seat 10 and another seat mounting base 28 attached to or integral with the opposite side of the vehicle seat 10. In the illustrated embodiment, the seat mounting base 26 is provided in the form of a floor-mountable seat base which extends between one side of a seat bottom 22 of the vehicle seat 10 and the floor 14 of the school bus 12 and which is mountable, i.e., attachable, to the floor 14 in a conventional manner. The seat mounting base 28 is illustratively provided in the form of a side wall-mountable seat base which extends between the opposite side of the seat bottom 22 of the vehicle seat 10 and the seat mounting rail 18 extending from the side wall 16 of the school bus 12, and which is mountable, i.e., attachable, to the seat mounting rail 18 in a conventional manner.

It will be noted that in the embodiment illustrated in FIG. 1, the vehicle seat 10 is mounted as described on a right side of the school bus 12, relative to a forward-facing direction of the school bus 12. In embodiments in which the vehicle seat 10 is mounted on the left side of the school bus 12, the positions of the seat mounting bases 26, 28 relative to the vehicle seat 10 may illustratively be exchanged, e.g., with mirror image versions thereof, to accommodate such mounting on the left side of the school bus 12. In either case, the seat mounting base 28 may, in some alternative embodiments, be provided in the form of a floor-mountable seat base, such as a mirror-image version of the seat mounting base 26 illustrated in FIG. 1, to accommodate floor-mounting of both sides of the vehicle seat 10.

In addition to the seat mounting base 20 and the seat bottom 22, the seat frame of the vehicle seat 10 further includes a seat back 24 having a front surface, e.g., facing the forward direction of the school bus 12, and a rear surface opposite the front surface, both of which extend upwardly and away from the seat bottom 22 to free end or top of the seat back 24. In the illustrated embodiment, the seat back 24 includes a frame member 30, e.g., in the form of a single tube or an interconnected plurality of tubes, which extends about a periphery of the seat back 24 between one side of the seat bottom 22 and the opposite side of the seat bottom 22. As most clearly shown in FIGS. 3 and 4, the seat frame further illustratively includes a pair of U-shaped or C-shaped brackets 38 (only one shown in FIGS. 3 and 4) each of which couple one end of the seat back frame member 30 to the seat mounting base 20 on either side of the vehicle seat 10. Each end of the seat back frame member 30 is received within the channel defined by one of the brackets 38, and a fixation member 39, e.g., a bolt, pin or other fixation member, secures the seat back frame member 30 to the bracket 38 and thus to the seat mounting base 20.

The seat back frame member 30 is illustratively, but need not be, hollow, and in the illustrated embodiment has a square cross-section. In alternate embodiments, the cross-section of the seat back frame member 30 may have other shapes including, for example, but not limited to, rectangular, circular, oval, a polygon with any number of sides, D-shaped or other cross-section. In any case, the seat back frame member 30 illustratively further has, or is attached to as part of the seat bottom 22 and/or as part of the seat frame generally, a base frame member 32 which extends between the seat mounting bases 26, 28 along an interface between the seat back 24 and the seat bottom 22. The base frame member 32 illustratively defines a bottom end of the seat back 24 seat back 24 in the illustrated embodiment, and the frame member 30 at the top of the seat back 24 defines the top end 34 of the seat back 24. In the illustrated embodiment, a seat back panel 36 is attached to the seat back frame member 30 at least partially about a periphery thereof and defines the front and rear surfaces of the seat back 24. The interface 23 between the seat bottom 22 and the seat back 24 (see, e.g., FIG. 2A) is defined, and may be referred to herein, as a "bight" of the vehicle seat 10.

As most clearly illustrated in FIGS. 1 and 2A, the seat frame further illustratively includes, in some embodiments, a retractor mounting frame 40 mounted to the seat back frame member 30 along the top 34 of the seat back 24. In one embodiment, the top of the retractor mounting frame 40 terminates at the top of the seat back frame member 30 such that the tops of the retractor mounting frame 40 and the top of the seat back frame member 30 together defined the top 34 of the seat back 24. In alternate embodiments, the top of the retractor mounting frame 40 may extend above the top of the seat back frame member 30 or the top of the seat back frame member 30 may extend above the top of the retractor mounting frame 40. In the illustrated embodiment, the seat back panel 36 terminates along the bottom of the retractor mounting frame 40, although in other embodiments the seat back panel 36 may extend upwardly beyond the bottom of the retractor mounting frame 40.

In the illustrated embodiment of the vehicle seat 10, the vehicle seat 10 is illustratively sized to carry, i.e., support in a seated position during operation of the school bus 12, up to three passengers or occupants of the vehicle seat 10. In this regard, the retractor mounting frame 40 is likewise illustratively configured to house, carry and/or otherwise be attached to, up to three web retractors each for connection to a different one of up to three restraint webs or harnesses for restraining the up to three occupants relative to the vehicle seat 10. As described hereinabove, the vehicle seat 10 is illustratively configurable, via appropriate selection of the seat base mounting members 26, 28 to be mountable to the school bus 12 on either side thereof (right side mounting, relative to a forward direction of the school bus 12, is illustrated in FIG. 1). The retractor mounting frame 40 in the illustrated embodiment is likewise illustratively configurable for right and/or left side mounting of the vehicle seat 10 in the school bus 12, and in this regard the illustrated retractor mounting frame 40 has four web retractor mounting ports, openings or mounting locations 42A-42D spaced apart and distributed transversely across the top of the seat back 24. In implementations of the vehicle seat 10 mounted at the right side of the school bus 12 as illustrated in FIG. 1, for example, a web retractor may be mounted in, to or at each of the web retractor mounting locations 42A, 42B and 42C and coupled to a different restraint web or harness for restraining a different respective one of up to three passengers seated in the vehicle seat 10 from left to right. Conversely, in implementations of the vehicle seat 10 mounted at the left side of the school bus 12, for example, a web retractor may be mounted in, to or at each of the web retractor mounting locations 42D, 42C and 42B and coupled to a different restraint web or harness for restraining a different respective one of up to three passengers seated in the vehicle seat 10 from right to left. It will be understood that in embodiments of the vehicle seat 10 which include the retractor mounting frame 40, the frame 40 may be configured to house, carry and/or otherwise be attached to more or fewer web retractors, and any corresponding web retractor mounting locations may be positioned at any desired locations relative to the frame 40.

The seat bottom 22 of the vehicle seat 10 is illustratively defined at least by the top surfaces of the seat base mounting base 20. In the illustrated embodiment, for example, support surfaces of the seat bottom 22 are defined at least by the top surface 44 of the seat mounting base 28 on one side of the vehicle seat 10 and by the top surface 46 of the seat mounting base 28 on the opposite side of the vehicle seat 10. In the illustrated embodiment, the vehicle seat 10 further includes a transverse frame member 48 extending across the front of the seat bottom 22 and attached at each end to one of the seat mounting bases 26, 28. In some embodiments, the top surface of the transverse frame member 48 is aligned with the top surfaces 44 and 46 of the seat mounting bases 28, 26 respectively and in such embodiments the top surface of the transverse frame member 48 defines another support surface of the seat bottom 22 along the front thereof. In alternate embodiments, the transverse frame member 48 may connect the seat mounting bases 26, 28 but not form a support surface of the seat bottom 22.

The illustrated vehicle seat 10 further includes at least one occupant restraint actuated seat back stiffening apparatus 50 mounted, attached or otherwise secured to, or integral with, the seat back 24 generally. In the illustrated embodiment, the vehicle seat 10 includes two such seat back stiffening apparatuses 50 each mounted to the seat back 24 at or adjacent to a different one of the opposite sides of the vehicle seat 10. Illustratively, the seat back stiffening apparatus(es) 50 is/are mounted, attached or otherwise secured to, or integral with, the seat back frame member 30 at a location along the seat back frame member 30 between the seat bottom 22 and the top of the seat back 24. In the following paragraphs, the structure and operation of the seat back stiffening apparatus 50 attached to the seat back frame 30 above the seat mounting base 26 will be described in detail, and it will be understood that such structure and operation applies equally to the seat back stiffening apparatus 50 attached to the seat back frame 30 above the seat mounting base 28. It will be further understood that this disclosure contemplates embodiments of the vehicle seat 10 which include both of the seat back stiffening apparatuses 50 as illustrated in FIGS. 1 and 2A, alternate embodiments which include only one seat back stiffening apparatus 50 and other alternate embodiments which include more than two seat back stiffening apparatuses 50, e.g., one for each occupant of the vehicle seat 10.

As most clearly illustrated in FIGS. 2B, 3, 4 and 5A, the seat back stiffening apparatus 50 illustratively includes an elongated bracket 52 having a top end 54 secured to the seat back 24, e.g., to the seat back frame member 30, and the bracket 52 illustratively extends, along and adjacent to the seat back frame 30, downwardly from the top end 54 toward the seat bottom 22 to a bottom end 56 thereof adjacent to the bight 23 of the vehicle seat 10 and above the top surface 46 of the seat mounting base 26. A restraint system anchor point 62 is defined near the bottom end 56 of the elongated bracket 52, and in the illustrated embodiment the connection point 62 is defined by a bore or through-hole, for connecting one end or portion of a restraint harness or web thereto. In alternate embodiments, the end 54 of the bracket 52 may be secured to the seat mounting base 26, and the end 56 of the bracket 52 may extend upwardly away from the seat mounting base 26 adjacent to the seat back frame 30.

In the illustrated embodiment, the elongated bracket 52 is illustratively provided in the form of an elongated L-shaped plate having a corner 55 which extends longitudinally along the elongated plate 52 between the top end 54 and the bottom end 56. A planar front plate portion 58 extends between the corner 55 and an outer longitudinal edge thereof facing the opposite side of the vehicle seat 10 (i.e., facing the seat mounting base 28) between the top end 54 and the bottom end 56, and a planar side plate portion 60 extends between the corner 55 and an outer longitudinal edge thereof facing in the rear direction relative to the forward direction of the vehicle 12 in which the vehicle seat 10 is mounted. The elongated plate 52 is illustratively secured to the seat back frame 30 at and/or adjacent to the top end 54 thereof in a conventional manner such as via one or more of a weld bond, an adhesive bond or the like, although in alternative embodiments one or more conventional fixation members may be alternatively or additionally used to secure the top or top portion of the bracket 52 to the seat back frame 30. In this embodiment, the connection point 62, e.g., in the form of an opening, extends through the side plate portion 60 near or adjacent to the bottom end 56 of the bracket 52. The bottom portion of the elongated bracket 52 is not itself directly attached to, or otherwise directly secured to, the seat back frame 30 or to any other portion of the seat frame; rather, the bottom portion of the elongated bracket is illustratively attached to the seat frame via a connecting arm or control bar 64 as will be described in detail below. In the unactuated or non-deployed state of the seat back stiffening apparatus 50 illustrated in FIGS. 1-5C, the front plate portion 58 extends substantially linearly along the seat back frame 30 at the front surface of the seat back 24 between the top end 54 and the bottom end 56 thereof, and the side plate portion 60 likewise extends linearly along the seat back frame 30 at a side surface of the seat back 24 defined between the front and rear surfaces of the seat back 24.

The seat back stiffening apparatus 50 further illustratively includes a connecting arm or control bar 64 having one end connected to the seat back frame 30 and an opposite end connected to the lower portion of the bracket 52. In one embodiment, for example and as most clearly illustrated in FIGS. 3 and 4, one end of the connecting arm 64 is secured to the C-shaped or U-shaped bracket 38 at or adjacent to the rear surface of the seat back 24 via the fixation member 39 described above. Alternatively or additionally, this end of the connecting arm 64 may be secured to one or more other structures of the seat frame such as the frame member 32, the seat mounting base 26 and/or directly to the seat back frame 30. Alternatively still, this end of the connecting arm 64 may be secured to the seat frame 30 and/or to the seat mounting base 26 at one or more locations other than at or adjacent to the rear surface seat back 24 as shown. In any case, in the illustrated embodiment, the elongated bracket 52 illustratively defines an opening 66 therethrough, e.g., adjacent to the corner 55 near the bottom end 56 thereof, and the connecting arm 64 extends through the opening 66. Illustratively, the opposite end 68 of the connecting arm 64 and the elongated bracket 52 are each complementarily configured to engage each other to thereby secure the end 68 of the connecting arm 64 to the front face of the bracket 52, e.g., to the front face of the front plate portion 58. Alternatively, one or more conventional fixation members may be used to secure the end 68 of the connecting arm 64 to the bracket 52. In some alternative embodiments, the connecting arm 64 and the bracket 52 may each be configured to secure the end 68 of the connecting arm 64 to the outwardly facing surface of the bracket 52, e.g., to the outwardly facing surface of the side plate portion 60, and on other alternative embodiments the connecting arm 64 and the bracket 52 may each be configured to secure the end 68 of the connecting arm 64 to the back side of the elongated bracket 52, e.g., to the rear face of the front plate portion 58 or to the inner facing surface of the side plate portion 60.

Referring now to FIG. 5C, the vehicle seat 10 illustrated in FIGS. 1-5B is shown including additional components of the vehicle seat 10 and including an occupant restraint system mounted to the vehicle seat 10 and coupled to the seat back stiffening apparatus 50. In the illustrated embodiment, for example, the vehicle seat 10 is shown having a conventional seat bottom cushion 72 supported on and by the seat bottom 22, e.g., supported on and by at least the top surface 44 of the seat mounting base 28 and the top surface 46 of the seat mounting base 26, and a conventional seat back cushion 74 coupled to the seat back 24 which covers the seat back frame 30, the seat back panel 26, the retractor mounting frame 40 (in embodiments which include the retractor mounting frame 40) and, at least partially, the seat back stiffening apparatus(es) 50. An occupant 75 of the vehicle seat 10 is shown in FIG. 5C positioned on the seat bottom cushion 72 and against the seat back cushion 74.

A conventional restraint harness 78 is coupled to the vehicle seat 10 and is configured and operable to restrain the occupant of the vehicle seat 10. In the illustrated embodiment, the restraint harness 78 includes at least one flexible web 80 which engages the seat back 24 at or near the top 34 thereof and which extends downwardly therefrom to define a chest portion 84 and a lap portion 82 both positionable across the occupant 75 with one end 86 of the lap portion 82 secured to the seat back stiffening apparatus 50. A conventional engagement member (not shown) is slidably received on the web 80 and is releasably attachable to a complementarily configured engagement member attached to the seat frame with the engagement member positioned between the lap portion 82 and the chest portion 84. The engagement member may be, for example, a conventional tongue and the complementarily configured engagement member a conventional buckle or vice versa. In any case, the flexible web 80 illustratively forms a three-point restraint system with the lap portion 82 of the web 80 coupled to the energy absorbing member 50, a portion of the web 80 above the chest portion 82 engaging the seat back 24 at or near the top 34 thereof and the engagement member releasably engaged with the complementarily configured engagement member between the lap portion 82 and the chest portion 84. In alternative embodiments, the restraint harness 78 just described may include multiple flexible webs and/or may be configured as a four or more point restraint system.

In one embodiment, as illustrated by example in FIG. 5C, one end 86 of the flexible web 80 is affixed to a plate or bracket 88 which is itself attached to the attachment point 62 of the bracket 52 of the seat back stiffening apparatus 50 via a conventional fixation member 65, e.g., a bolt, pin or other conventional fixation member at or near the bight 23 of the seat 10. In some alternative embodiments, the bracket 52 or other suitable portion of the seat back stiffening apparatus 50 may be configured to include a web guide via which the end 86 of the flexible web 80 may be directly attached to the seat back stiffening apparatus 50.

In one embodiment, the opposite end 90 of the flexible web 80 may be attached directly to the seat back, e.g., to the seat back frame 30 and/or to the web retractor frame 40 (in embodiments which include the web retractor frame 40), at or near the top 34 of the seat back 24. In such embodiments, the flexible web 80 engages the seat back 24 at or near the top 34 thereof, as described above, via attachment of the end 90 of the flexible web 80 to the seat back 24 at or near the top 34 thereof. In some alternate embodiments, the end 90' of the flexible web 80' may extend over or through the seat back 24 at or near the top 34 thereof and extend downwardly along the back side or surface of the seat back 24 into attachment with the seat back 24, seat bottom 22 and/or other portion of the seat frame at or near the bottom of the seat back 24, as illustrated by dashed-line representation in FIG. 5C. In such alternate embodiments, a portion of the web 80 between the chest portion 84 and the end 90' of the web 80 engages the seat back 24 at or near the top 34 thereof as described above.

In some embodiments which include the web retractor frame 40, one or more conventional web retractors may be mounted thereto, e.g., via one or more of the web retractor mounting locations 42A-42D. In the illustrated embodiment, one such conventional web retractor 92 is shown mounted to the web retractor frame 40 and includes a conventional spool 94 connected to the end 90 of the flexible web 80, as illustrated by dashed-line representation in FIG. 5C. In the example illustrated in FIG. 5C, the web retractor 92 is illustratively mounted to the web retractor frame 40 at the web retractor mounting location 42C, although in other implementations described above, the web retractor 92 may be alternatively mounted to the web retractor frame 40 at the web retractor mounting location 42D. In any such embodiment, the flexible web 80 engages the seat back 24 at or near the top 34 thereof, as described above, via attachment of the end 90 of the flexible web 80 to the web retractor 92 attached to the seat back 24 at or near the top 34 thereof. In some alternate embodiments, a web retractor 92' may be alternatively mounted to the seat back 24, seat bottom 22 and/or other portion of the seat frame at or adjacent to the bottom end of the seat back 24, and in such embodiments the end 90' of the flexible web 80' may extend over or through the seat back 24 at or near the top 34 thereof and extend downwardly along the back side or surface of the seat back 24 into attachment with the spool of the web retractor 92' as illustrated by dashed-line representation in FIG. 5C. In such alternate embodiments, a portion of the web 80 between the chest portion 84 and the end 90' of the web 80 engages the seat back 24 at or near the top 34 thereof as described above.

In any embodiment in which the end 90 of the web 80 is attached to a web retractor 92, such a web retractor 92 is illustratively a conventional emergency locking retractor (ELR) having a normally unlocked state in which the spool 94 is freely rotatable in a web payout direction, and also having a locked state, to which the retractor 92 switches from the unlocked state upon the occurrence of a deceleration event (e.g., crash or sudden stop) of sufficiently rapid duration, in which the spool 94 is blocked or prevented from rotating in the web payout direction to thereby prevent movement of the flexible web in the web payout direction. In some embodiments, the web retractor 92 may alternatively or additionally be a conventional automatic locking retractor (ALR) or have conventional ALR features in which the ALR locks the position of the web 80 relative to the web retractor 92 after engagement of the web 80 about the occupant 75, i.e., after the web 80 is drawn across the occupant 75 and the engagement member is releasably engaged with the complementarily configured engagement member as described above.

In any case, the normal, unactuated or non-deployed position of the seat back stiffening apparatus 50 during operation of the vehicle 12 carrying the vehicle seat 10 is that illustrated in FIG. 5C in which the occupant 75 is seated in the vehicle seat 10 with the flexible web 80 extended across the occupant 75 in a three-point configuration as described above, and in which the bracket 52 of the seat back stiffening apparatus 50 is substantially co-extensive with the seat back frame 30 as shown. The seat back stiffening apparatus 50 is actuated and operable to stiffen, i.e., to add stiffness to, the seat back 24, as will be described in detail below, during a crash event or other event resulting in deceleration of the vehicle 12 of sufficiently rapid duration to cause the occupant 75 to apply a force to the flexible web 80 in the forward direction, i.e., in a direction away from the front surface of the seat back 24, of at least a threshold magnitude.

Figure 6D:
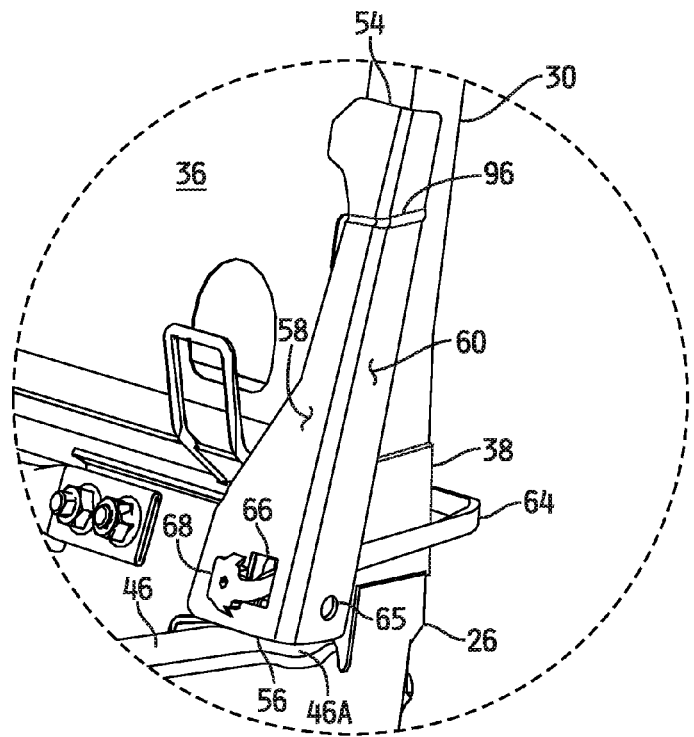
FIG. 6D is a magnified view of a portion of the vehicle seat illustrated in FIG. 6C.

Referring now to FIGS. 6A and 6B, operation of the seat back stiffening apparatus 50 of FIGS. 1-5C is shown during a crash event (i.e., an event involving an impact of the vehicle 12 with another vehicle or other object) or other event resulting in deceleration of the vehicle 12 of sufficiently rapid duration to cause the occupant 75 to apply a force, F, to the flexible web 80 in the forward direction, i.e., in a direction away from the front surface of the seat back 24, of at least a threshold magnitude. As shown in FIG. 6A, a crash or other deceleration event of sufficient severity causes the occupant 75 to be displaced forwardly relative to the vehicle seat 10, i.e., in a direction away from the front surface of the seat back 24. This causes the occupant 75 to apply a force, F, in the forward direction to the flexible web 80, wherein the applied force, F, is the sum of a first force, $F_1$, applied by the occupant 75 to the seat back stiffening apparatus 50 via the lap portion 82 of the flexible web 80 and a second force, $F_2$, applied by the occupant 75 to the engagement point of the web 80 with the seat back 24 at or near the top 34 thereof via the chest portion 84. Illustratively, application of the force $F_1$ by the web 80 to the bracket 52 of the seat back stiffening apparatus 50 causes the lower portion of the bracket 52 to be drawn away from the seat back frame 30 when the magnitude of the force, $F_1$, exceeds a threshold force, $F_{TH1}$ such that the lower portion of the bracket 52 becomes spaced apart from the seat back frame 30.

Figure 6C:
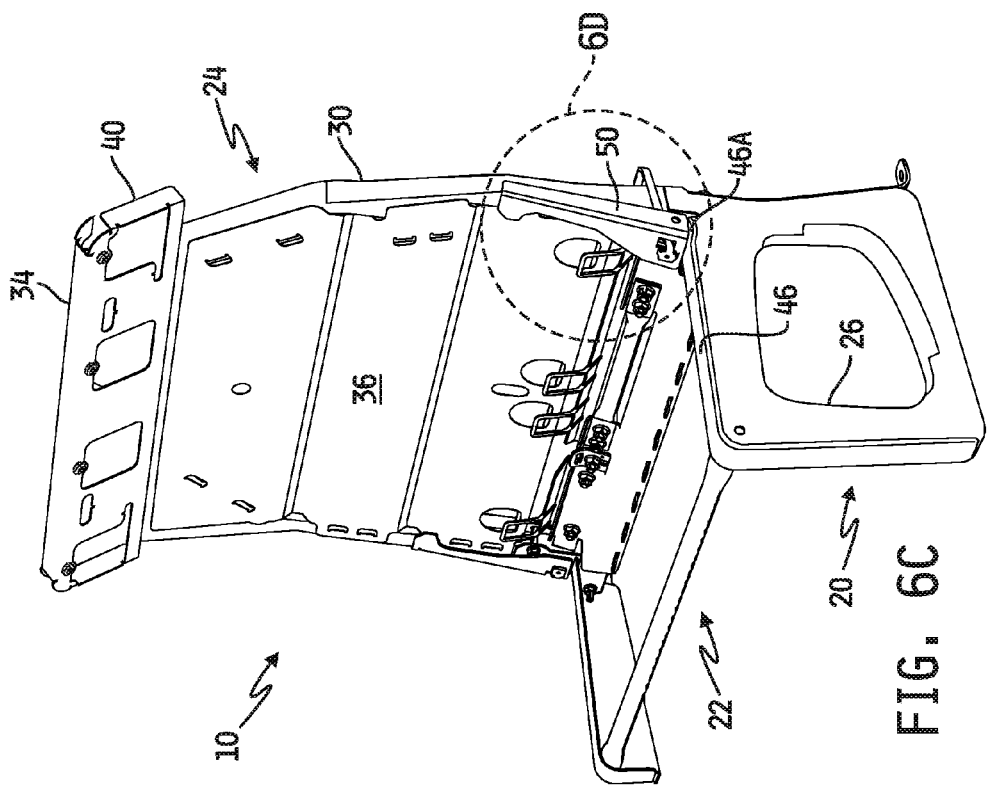
FIG. 6C is a perspective view of the vehicle seat illustrated in FIGS. 1-5B shown after completion of the crash event illustrated in FIGS. 6A-6B.

The threshold force, $F_{TH1}$, at and beyond which the bracket 52 of the seat back stiffening apparatus 50 begins and continues to be drawn away from the seat back frame 30, is illustratively defined by the dimensional aspects of a number of the structural components of the seat back stiffening apparatus 50. In the embodiment of the seat back stiffening apparatus 50 illustrated in FIGS. 1-6C, the threshold force, $F_{TH1}$, is illustratively defined by, for example, but not limited to, one or more of the length of the elongated bracket 52, the stiffness of the material used to fabricate the bracket 52 (e.g., steel or other metal or metal composite), the length of the connecting arm 64, the orientation of the connecting arm 64, the thickness of the connecting arm 64, the material used to fabricate the connecting arm 64 (e.g., steel or other metal or metal composite), the location on the seat frame to which the connecting arm 64 is attached, the location on the bracket 52 to which the connecting arm is attached, the location on the bracket 52 to which the lap portion 82 of the web 80 is attached, and the like. In any case, if and when a force $F_1$ greater than $F_{TH1}$ is applied as illustrated in FIG. 6C, the bottom portion of the bracket 52 of the seat back stiffening apparatus 50 begins and continues to be drawn away from the seat back frame 30, i.e., the bottom portion of the bracket 52 moves in the forward direction (away from the front surface of the seat back 24) as the connecting arm 64 begins to deform.

As the bottom portion of the bracket 52 moves forward, the bracket 52 may begin to form a crease 96 adjacent to the top portion of the bracket 52 that is secured to the seat back frame 30, as illustrated in FIG. 6B. As the force $F_1$ continues to be applied by the lap portion 82 of the web 80, the bottom portion of the bracket 52 continues to move forward as the connecting arm 64 continues to deform. Illustratively, such deformations of the bracket 52 and of the connecting arm 64 are inelastic in embodiments in which non-resilient materials, e.g., steel or other metal or metal composite, are used for the bracket 52 and for the connecting arm 64. At some point during application of the force $F_1$ in excess of $F_{TH1}$, the connecting arm 64 becomes maximally deformed and forward motion of the bottom portion of the bracket 52 ceases with the bottom portion of the bracket 52 spaced apart from the seat back frame 30 by, e.g., a specified or predetermined distance. In this regard, the connecting arm 64 acts as a travel stop to forward movement of the bracket 52 under the force $F_1$ in excess of $F_{TH1}$.

As the force $F_1$ is applied to the bracket 52 of the seat back stiffening apparatus 50, the force $F_2$ is applied by the occupant 75 to the engagement point of the web 80 with the seat back 24 at or near the top 34 thereof via the chest portion 84 as briefly described above. Illustratively, the seat back frame 30 is designed to have a target stiffness or rigidity, wherein the term "stiffness," as it is used to herein in relation to the seat back frame 30 or seat back 24 generally, carries its ordinary meaning, e.g., a measure of the resistance of the seat back frame 30 or seat back 24 generally to deformation in response to an applied force. When the magnitude of the force $F_2$ exceeds a threshold force $F_{TH2}$, the designed stiffness of the seat back frame 30 is overcome and the seat back 24 begins to deform forwardly and downwardly, i.e., in the direction of the force $F_2$. The threshold force, $F_{TH2}$, is illustratively defined by the dimensional aspects of the structural components of the seat back 24, examples of which include, but are not limited to, one or more of the thickness, shape and/or cross-sectional area of the seat back frame 30, the type of material used for the seat back frame 30, the thickness of the seat back panel 36, the type of material used for the seat back panel 36, and the like. In any case, initial deformation of the seat back frame 30, i.e., upon initial application of the force $F_2$ in excess of the threshold force $F_{TH2}$, is illustratively in the forward direction as illustrated by example in FIG. 6A and, as such deformation continues, the top portion of the top 34 of the seat back 24 is forced downwardly toward the seat bottom 22 as illustrated in FIG. 6C. Generally, the two forces $F_1$ and $F_2$ acting simultaneously on the bracket 52 of the seat back stiffening apparatus 50 and the top 34 of the seat back 24 respectively result in simultaneous forward movement of the bottom portion of the bracket 52, as illustrated in FIG. 6B, and forward and downward movement of the seat back 24 and top portion 34 of the seat back 24 as illustrated in FIGS. 6A and 6C respectively.

At some point during the application of such forces $F_1$ and $F_2$, the downward movement of the top portion 34 of the seat back 24 drives the bottom end 56 of the bracket 52, which has been extended away from the seat back frame 30 by the forward movement thereof, into the top surface 46 of the seat mounting base 26. Depending upon the magnitude of the forces $F_1$ and $F_2$, this may result in some amount of deformation of the top surface 46 in the area 46A contacted by the bottom end 56 of the energy absorbing bracket 52 as shown by the exaggerated example illustrated in FIG. 6D. In any case, contact of the bottom end 56 of the bracket 52 with the top surface 46 of the seat mounting base 26 effectively couples the seat back stiffening apparatus 50 between the top surface 46 of the seat mounting base 26 and the seat back frame 30, thereby imparting additional stiffness to the seat back frame 30 and, as a result, serving to limit, at least to some extent, the forward movement of the seat back 24 and/or the downward movement of the seat back 24 at or near the top 34 thereof. In alternate embodiments in which the bracket is affixed to the seat mounting base 26 as described above, downward movement of the top portion 34 of the seat back 24 illustratively drives the seat back frame 30 into the free end 56 of the bracket 52.

As described hereinabove, the vehicle seat 10 may accommodate up to three occupants, each having a dedicated restraint harness or web for restraining the occupant relative to the vehicle seat 10. In some instances, only a single occupant may occupy the vehicle seat 10, and if the single occupant is seated adjacent to either of the sides of the vehicle seat 10, operation of the seat back stiffening apparatus 50 will be as just described. In other instances, two occupants may occupy the vehicle seat 10, and in such instances the total force applied to the vehicle seat 24 at or near the top 34 thereof will be the sum of the two forces $F_2$ applied by the two occupants to the chest portions 84 of the two occupants' flexible webs 80. If the two occupants are seated adjacent to the two different sides of the vehicle seat 10, the force $F_1$ applied by one occupant to the lap portion 82 of that occupant's flexible web 80 will be applied to the bracket 52 of the seat back stiffening apparatus 50 attached to that side of the vehicle seat 10 and the force $F_1$ applied by the other occupant to the lap portion 82 of that occupant's flexible web 80 will be applied to the bracket 52 of the seat back stiffening apparatus 50 attached to the other side of the vehicle seat 10, wherein each such seat back stiffening apparatus 50 will be individually responsive only to the force applied thereto as described above. If, on the other hand, one of the two occupants is seated in the middle of the vehicle seat 10, only one of the seat back stiffening apparatuses 50 will be operative as the lap portion 82 of the middle occupant's flexible web 80 will be attached directly to the seat frame. In still other instances, three occupants may occupy the vehicle seat 10, and in such instances the total force applied to the vehicle seat 24 at or near the top 34 thereof will be the sum of the three forces $F_2$ applied by the three occupants to the chest portions 84 of the three occupants' flexible webs 80. The forces $F_1$ applied by the two occupants seated adjacent to the opposite sides of the vehicle seat 10 to the lap portions 82 of their flexible webs 80 will be applied to the bracket 52 of the seat back stiffening apparatus 50 attached to the corresponding sides of the vehicle seat 10, wherein each such seat back stiffening apparatuses 50 will be individually responsive only to the force applied thereto as described above. The force $F_1$ applied by the middle occupant to the lap portion 82 of that occupant's flexible web 80 will be applied directly to the seat frame.

As briefly described above, the seat back 24 and seat back frame 30 are illustratively designed to have a target stiffness or rigidity, i.e., a designed resistance of the seat back frame 30 or seat back 24 generally to deformation in response to an applied force. In embodiments in which the seat 10 is a bus seat, as illustrated by example in FIG. 1, the target stiffness is illustratively selected to provide some amount of rigidity in the seat back 24 for and during normal operating conditions while also allowing for the seat back 24 to deform forwardly, e.g., to dissipate energy, when impacted from the rear by one or more occupants of a bus seat positioned behind the seat 10. However, when sufficient forward force is applied to the top 34 of the seat 10 by one or more occupant restraint harnesses 78 as just described, such force may overcome the designed stiffness of the seat back 24 and seat back frame 30 and cause the seat back 24 to deform forwardly and downwardly. The seat back stiffening apparatus(es) 50 is/are illustratively designed, when deployed or actuated as just described, to add back to the seat back 24 and seat back frame 30 some, all or more of the stiffness overcome by the force(s) applied to the seat back 24 and seat back frame 30 by the one or more occupant restraint harnesses 78. Thus, during a crash event when no occupants occupy the seat 10, and also when one or more occupants occupy the seat 10 but do not apply sufficient force to the one or more restraint harnesses 78 to activate or deploy the seat back stiffening apparatus(es) 50, the seat back stiffening apparatus(es) 50 remain(s) unactuated or non-deployed and the target stiffness of the seat back 24 allows the seat back 24 to deform forwardly as designed when impacted from the rear as described above. However, when one or more occupants occupy the seat 10 and do apply sufficient force to the one or more restraint harnesses 78 to actuate or deploy the seat back stiffening apparatus(es) 50, the seat back stiffening apparatus(es) 50 add(s) back to the seat back 24 some, all or more of the stiffness lost or overcome by such force(s) applied by the one or more occupant restraint harnesses 78 to the seat back 24 and seat back frame 30 so that the seat back 24 will deform forwardly as designed when impacted from the rear under such conditions.

In any case, the actuator of the seat back stiffening apparatus 50, i.e., the component or structure of the seat back stiffening apparatus 50 to which the occupant restraint web 80 is coupled and which is responsive to force applied by the web 80 to deploy or activate the seat back stiffening apparatus 50, is the bottom portion of the bracket 52. The stiffening component or structure of the seat back stiffening apparatus 50 illustrated in FIGS. 1-6D, i.e., the component or structure which actually adds stiffness to the seat back by extending between and in contact with the seat mounting base 26 and the seat back frame 30, is the bracket 52, and the travel stop, i.e., the component or structure which limits and stops movement of the stiffening component relative to the seat frame, is the connecting arm or control bar 64.

Figure 7A:
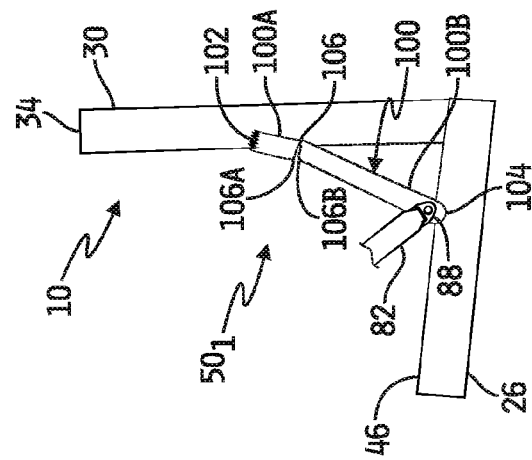
FIG. 7A is a simplified side-view diagram of the vehicle seat illustrated in FIG. 1 including another embodiment of an occupant restraint actuated apparatus for dynamically stiffening the vehicle seat back.
Figure 7B:
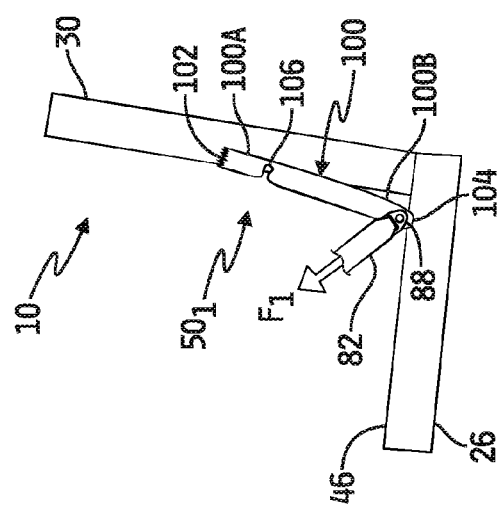
FIG. 7B is another simplified side view diagram of the vehicle seat shown in FIG. 7A illustrating operation of the apparatus during a vehicle crash event.
Figure 7C:
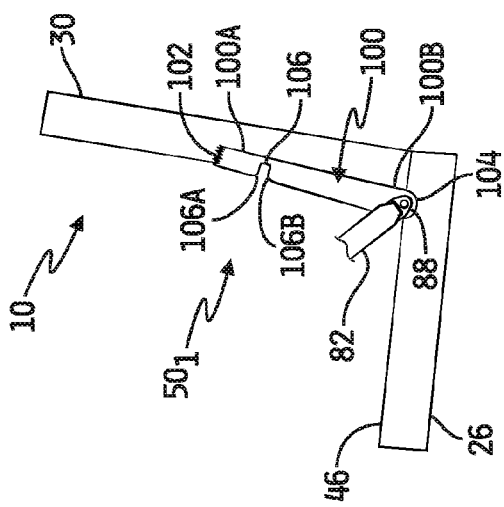
FIG. 7C is yet another simplified side view diagram of the vehicle seat of FIGS. 7A and 7B shown after completion of the crash event illustrated in FIG. 7B.

Referring now to FIGS. 7A-7C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus $50_1$ coupled to the seat 10. Although the vehicle seat 10 and the occupant restraint harness 78 are illustrated in FIGS. 7A-7C in simplified form, it will be understood that the seat 10 and the occupant restraint harness 78 are both structurally and functionally as illustrated herein and described above, and that only the seat back stiffening apparatus $50_1$ is different. FIG. 7A illustratively shows the vehicle seat 10 with the seat back stiffening apparatus $50_1$ in its normal, unactuated or non-deployed state, FIG. 7B shows the vehicle seat 10 during a crash event as described above and FIG. 7C shows the vehicle seat 10 at or near the end of the crash event.

In the illustrated embodiment, the seat back stiffening apparatus $50_1$ includes an elongated bracket 100 having a top end 102 and a bottom end 104 opposite the top end 102. The bracket 100 is secured at or near its top end 102 to the seat back frame 30 and in the unactuated state of the apparatus $50_1$ the bracket 100 extends downwardly and substantially coextensive or parallel with the seat back frame 30. The plate or bracket 88 to which the lap portion 82 of the web 80 is affixed is itself illustratively attached to the bracket 100 at or near the bottom end 104 thereof at or near the bight 23 of the seat 10. In alternate embodiments, the end 102 of the bracket 100 may be secured to the seat mounting base 26, and the end 104 of the bracket 100 may extend upwardly away from the seat mounting base 26 adjacent to the seat back frame 30.

Between the two ends 102, 104, the bracket 100 illustratively defines a forward-facing notch 106 therein having an upper notch edge 106A and an oppositely facing lower notch edge 106B. The notch 106 illustratively divides the bracket 100 into an upper portion 100A between the top end 102 of the bracket 100 and the notch 106 and a lower portion 100B between the bottom end 104 of the bracket 100.

As illustrated in FIGS. 7B and 7C, application of the force $F_1$, in excess of the threshold force $F_{TH1}$, to the lap portion 82 of the web 80 draws the end portion 104 of the bracket 100 forwardly and away from the seat back frame 30 as described with respect to the bracket 52 of FIGS. 1-6D. With the top end 102 of the bracket 100 affixed to the seat back frame 30 and therefore stationary relative thereto, the bracket 100 deforms in the area of the notch 106 such that distance between the upper and lower notch edges 106A, 106B decreases as the force $F_1$ continues to be applied to the end 104 of the bracket 100. When the two notch edges 106A, 106B meet, this stops forward motion of the end 104 of the bracket 100, and the top portion of the top 34 of the seat back 24 is forced downwardly toward the seat mounting base 26 as illustrated in FIG. 7C, thereby forcing the end 104 of the bracket 100, which has been extended away from the seat back frame 30 by the forward movement thereof, into contact with the top surface 46 of the seat mounting base 26. Such contact of the bottom end 104 of the bracket 100 with the top surface 46 of the seat mounting base 26 effectively couples the bracket 100 of the seat back stiffening apparatus $50_1$ between the top surface 46 of the seat mounting base 26 and the seat back frame 30, thereby imparting additional stiffness to the seat back frame 30 as described hereinabove with respect to the bracket 52 of the seat back stiffening apparatus 50.

In the embodiment illustrated in FIGS. 7A-7C, the actuator of the seat back stiffening apparatus $50_1$, i.e., the component or structure of the seat back stiffening apparatus $50_1$ to which the lap portion 82 of the occupant restraint web 80 is coupled and which is responsive to force applied by the lap portion 82 of the web 80 to deploy or activate the seat back stiffening apparatus $50_1$, is the bottom portion of the bracket 100. The stiffening component or structure of the seat back stiffening apparatus $50_1$ illustrated in FIGS. 7A-7C, i.e., the component or structure which actually adds stiffness to the seat back by extending between and in contact with the seat mounting base 26 and the seat back frame 30, is also the bracket 100, and the travel stop, i.e., the component or structure which limits and stops movement of the stiffening component relative to the seat frame, is the notch 106 defined in the front-facing surface of the bracket 100.

Figure 8A:
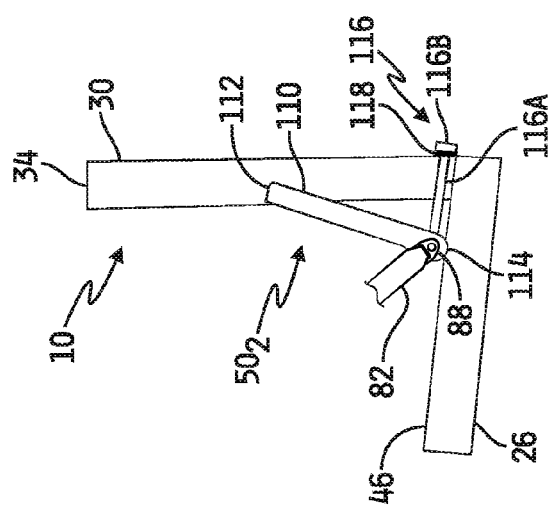
FIG. 8A is a simplified side-view diagram of the vehicle seat illustrated in FIG. 1 including yet another embodiment of an occupant restraint actuated apparatus for dynamically stiffening the vehicle seat back.
Figure 8B:
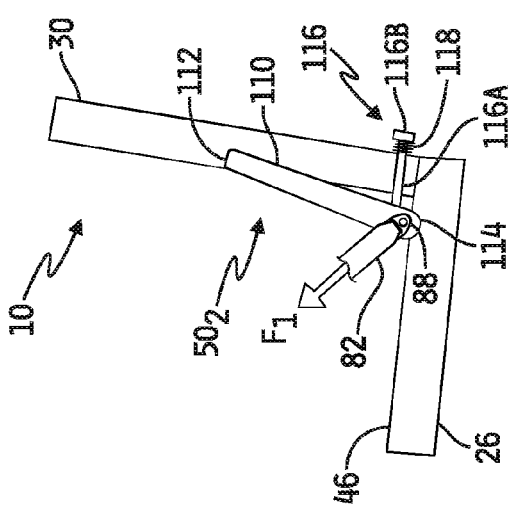
FIG. 8B is another simplified side view diagram of the vehicle seat shown in FIG. 8A illustrating operation of the apparatus during a vehicle crash event.
Figure 8C:
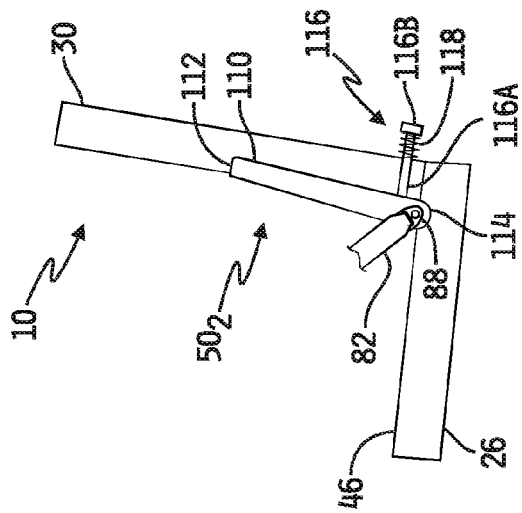
FIG. 8C is yet another simplified side view diagram of the vehicle seat of FIGS. 8A and 8B shown after completion of the crash event illustrated in FIG. 8B.

Referring now to FIGS. 8A-8C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus $50_2$ coupled to the seat 10. Although the vehicle seat 10 and the occupant restraint harness 78 are illustrated in FIGS. 8A-8C in simplified form, it will be understood that the seat 10 and the occupant restraint harness 78 are both structurally and functionally as illustrated herein and described above, and that only the seat back stiffening apparatus $50_2$ is different. FIG. 8A illustratively shows the vehicle seat 10 with the seat back stiffening apparatus $50_2$ in its normal, unactuated or non-deployed state, FIG. 8B shows the vehicle seat 10 during a crash event as described above and FIG. 8C shows the vehicle seat 10 at or near the end of the crash event.

In the illustrated embodiment, the seat back stiffening apparatus $50_2$ includes an elongated bracket 110 having a top end 112 and a bottom end 114 opposite the top end 112. The bracket 110 is secured at or near its top end 112 to the seat back frame 30 and in the unactuated state of the apparatus $50_2$ the bracket 110 extends downwardly and substantially coextensive or parallel with the seat back frame 30. The plate or bracket 88 to which the lap portion 82 of the web 80 is affixed is itself illustratively attached to the bracket 110 at or near the bottom end 112 thereof, e.g., at or near the bight 23 of the seat 10. In alternate embodiments, the end 112 of the bracket 110 may be secured to the seat mounting base 26, and the end 114 of the bracket 110 may extend upwardly away from the seat mounting base 26 adjacent to the seat back frame 30.

One end of a shaft 116A of a spring member 116 illustratively extends through or alongside the seat back frame 30 and is coupled to the bracket 110 at or near the bottom end 114 thereof. An opposite end of the shaft 116A is coupled to a head 116B, and a spring, e.g. a coil spring, 118 is received onto the shaft 116A of the spring member 116 and is positioned between the seat back frame 30 and the head 116B of the spring member 116.

As illustrated in FIGS. 8B and 8C, application of the force F1, in excess of the threshold force $FTH_1$, to the lap portion 82 of the web 80 draws the end portion 114 of the bracket 110 forwardly and away from the seat back frame 30 as described with respect to the bracket 52 of FIGS. 1-6D. As the bottom end 114 of the bracket 110 moves forward in response to the force $F_1$, it carries the shaft 116A of the spring member 116 with it, thereby compressing the spring 118 between the head 116B and the seat back frame 30. When the head 116B of the spring member 116 meets the seat back frame member 116, this stops forward motion of the end 114 of the bracket 110, and the top portion of the top 34 of the seat back 24 is forced downwardly toward the seat mounting base 26 as illustrated in FIG. 8C, thereby forcing the end 114 of the bracket 110, which has been extended away from the seat back frame 30 by the forward movement thereof, into contact with the top surface 46 of the seat mounting base 26. Such contact of the bottom end 114 of the bracket 110 with the top surface 46 of the seat mounting base 26 effectively couples the bracket 110 of the seat back stiffening apparatus $50_2$ between the top surface 46 of the seat mounting base 26 and the seat back frame 30, thereby imparting additional stiffness to the seat back frame 30 as described hereinabove with respect to the bracket 52 of the seat back stiffening apparatus 50.

In the embodiment illustrated in FIGS. 8A-8C, the actuator of the seat back stiffening apparatus $50_2$, i.e., the component or structure of the seat back stiffening apparatus $50_2$ to which the lap portion 82 of the occupant restraint web 80 is coupled and which is responsive to force applied by the lap portion 82 of the web 80 to deploy or activate the seat back stiffening apparatus $50_2$, is the bottom portion of the bracket 110. The stiffening component or structure of the seat back stiffening apparatus $50_2$ illustrated in FIGS. 8A-8C, i.e., the component or structure which actually adds stiffness to the seat back by extending between and in contact with the seat mounting base 26 and the seat back frame 30, is also the bracket 110, and the travel stop, i.e., the component or structure which limits and stops movement of the stiffening component relative to the seat frame, is the spring member 116.

Figure 9C:
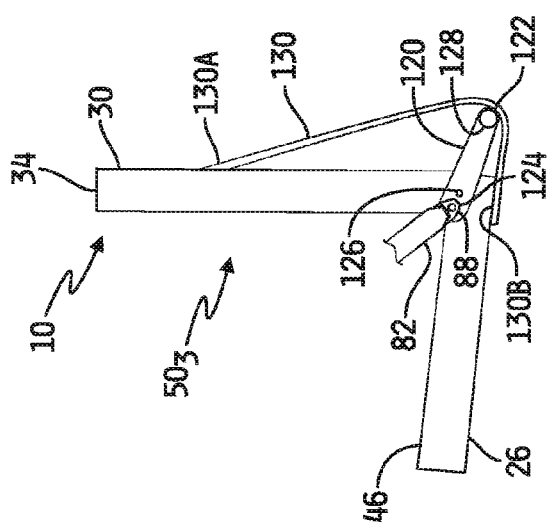
FIG. 9C is yet another simplified side view diagram of the vehicle seat of FIGS. 9A and 9B shown after completion of the crash event illustrated in FIG. 9B.
Figure 9B:
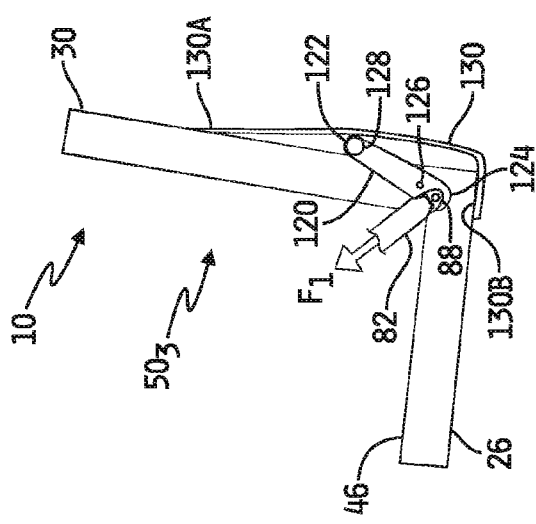
FIG. 9B is another simplified side view diagram of the vehicle seat shown in FIG. 9A illustrating operation of the apparatus during a vehicle crash event.
Figure 9A:
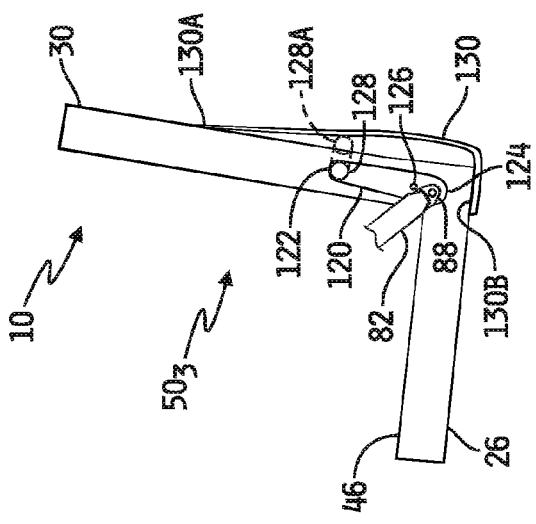
FIG. 9A is a simplified side-view diagram of the vehicle seat illustrated in FIG. 1 including still another embodiment of an occupant restraint actuated apparatus for dynamically stiffening the vehicle seat back.

Referring now to FIGS. 9A-9C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus $50_3$ coupled to the seat 10. Although the vehicle seat 10 and the occupant restraint harness 78 are illustrated in FIGS. 9A-9C in simplified form, it will be understood that the seat 10 and the occupant restraint harness 78 are both structurally and functionally as illustrated herein and described above, and that only the seat back stiffening apparatus $50_3$ is different. FIG. 9A illustratively shows the vehicle seat 10 with the seat back stiffening apparatus $50_3$ in its normal, unactuated or non-deployed state, FIG. 9B shows the vehicle seat 10 during a crash event as described above and FIG. 9C shows the vehicle seat 10 at or near the end of the crash event.

In the illustrated embodiment, the seat back stiffening apparatus $50_3$ includes an elongated bracket 120 having a top end 122 and a bottom end 124 opposite the top end 122. The bracket 120 is pivotably attached to the seat back frame 30, e.g., via a suitable pin or conventional fixation member 126. At or near the top of the bracket 120 is optionally positioned a roller or ball, and in some embodiments the apparatus $50_3$ further includes a guide sleeve 128A configured to guide the top portion of the bracket 120 rearwardly under actuated or deployed conditions of the apparatus $50_3$. In the unactuated state of the apparatus $50_3$, the bracket 120 extends downwardly from the top end 122 toward the bottom end 124 and substantially coextensive or parallel with the seat back frame 30. The plate or bracket 88 to which the lap portion 82 of the web 80 is affixed is itself illustratively attached to the bracket 120 at or near the bottom end 124 thereof, e.g., at or near the bight 23 of the seat 10. An elongated strap or web 130 is illustratively affixed at a top end 130A thereof to the seat back 24, e.g., to the seatback frame 30 between the top and bottom ends thereof. A bottom end 130B of the strap or web 130 is illustratively affixed to the seat mounting base 26, e.g., to an underside thereof. In an alternate embodiment, the bracket 120 may be pivotably mounted to the seat bottom 24, e.g., to the seat mounting base 26.

As illustrated in FIGS. 9B and 9C, application of the force $F_1$, in excess of the threshold force $F_{TH1}$, to the lap portion 82 of the web 80 draws the end portion 124 of the bracket 120 forwardly and away from the seat back frame 30, thereby causing the bracket 120 to pivot about the pin or fixation member 126 such that the top portion 122 of the bracket 120, optionally guided by the optional guide sleeve 128A, to move toward and eventually into engagement with the strap or web 130 between its two ends 130A, 130B. As the bottom end 124 of the bracket 120 continues to pivot about the pin 126 in response to the force $F_1$, the end 122 of elongated bracket 120 presses into the strap or web 130, thereby causing it to eventually become taught as illustrated in FIG. 9C. When the longitudinal axis of the elongated bracket 120 is at or near parallel with the direction of the force $F_1$, the bracket 120 ceases pivoting about the pin 126 and the end 122 of the elongated bracket 120 pressing into the strap or web 130 in this position causes the strap or web 130 to be fully taught, thereby imparting additional stiffness to the seat back frame 30.

In the embodiment illustrated in FIGS. 9A-9C, the actuator of the seat back stiffening apparatus 50₃, i.e., the component or structure of the seat back stiffening apparatus 50₃ to which the lap portion 82 of the occupant restraint web 80 is coupled and which is responsive to force applied by the lap portion 82 of the web 80 to deploy or activate the seat back stiffening apparatus 50₃, is the bracket 120. The stiffening component or structure of the seat back stiffening apparatus 50₃ illustrated in FIGS. 9A-9C, i.e., the component or structure which actually adds stiffness to the seat back by extending between and in contact with the seat mounting base 26 and the seat back frame 30, is the web or strap 130, and the travel stop, i.e., the component or structure which limits and stops movement of the stiffening component relative to the seat frame, is also the bracket 120.

Figure 10C:
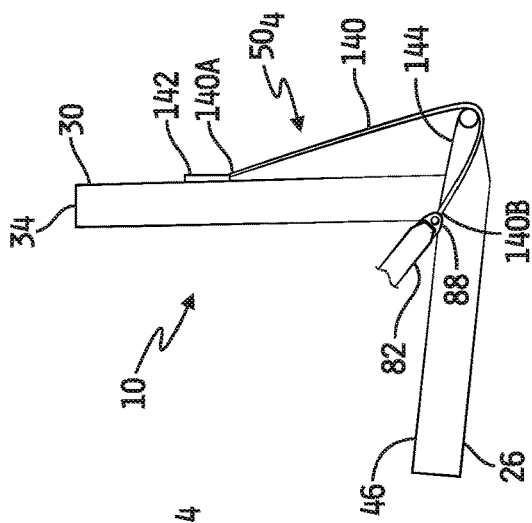
FIG. 10C is yet another simplified side view diagram of the vehicle seat of FIGS. 10A and 10B shown after completion of the crash event illustrated in FIG. 10B.
Figure 10B:
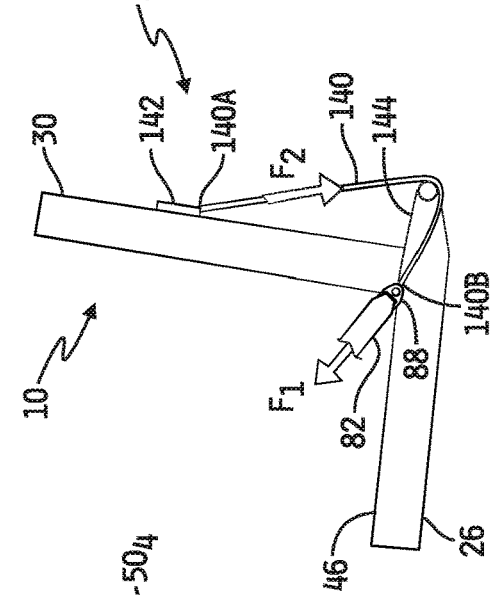
FIG. 10B is another simplified side view diagram of the vehicle seat shown in FIG. 10A illustrating operation of the apparatus during a vehicle crash event.
Figure 10A:
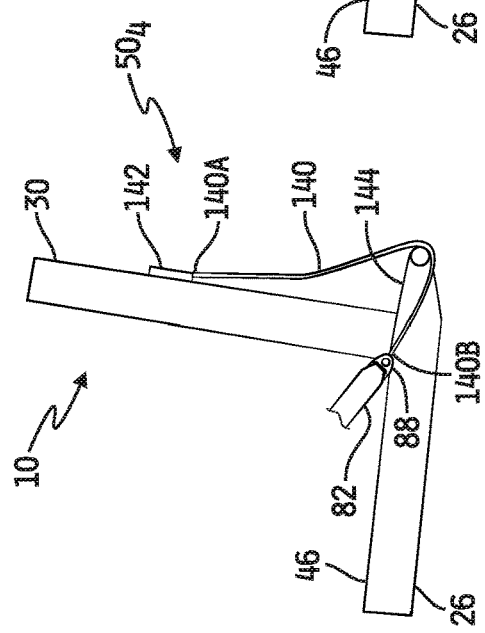
FIG. 10A is a simplified side-view diagram of the vehicle seat illustrated in FIG. 1 including a further embodiment of an occupant restraint actuated apparatus for dynamically stiffening the vehicle seat back.

Referring now to FIGS. 10A-10C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus 50₄ coupled to the seat 10. Although the vehicle seat 10 and the occupant restraint harness 78 are illustrated in FIGS. 10A-10C in simplified form, it will be understood that the seat 10 and the occupant restraint harness 78 are both structurally and functionally as illustrated herein and described above, and that only the seat back stiffening apparatus 50₄ is different. FIG. 10A illustratively shows the vehicle seat 10 with the seat back stiffening apparatus 50₄ in its normal, unactuated or non-deployed state, FIG. 10B shows the vehicle seat 10 during a crash event as described above and FIG. 10C shows the vehicle seat 10 at or near the end of the crash event.

In the illustrated embodiment, the seat back stiffening apparatus 50₄ includes an elongated strap or web 140 affixed at a top end 140A thereof to the seat back 24, e.g., to a plate or bracket 142 or other support structure coupled to the seatback 24 or frame 30 between the top and bottom ends thereof or, in some embodiments directly to the seat back frame 30. A bottom end 140B of the strap or web 140 is illustratively affixed to the plate or bracket 88 to which the lap portion 82 of the web 80 is affixed, e.g., at or near the bight 23 of the seat 10. An elongated bracket 144 or other rigid structure is affixed at one end to the rear of the seat mounting base 26 and/or to the rear of the seat back frame 30, and an opposite end contacts the strap or web 140 between its ends 140A, 140B.

As illustrated in FIGS. 10B and 10C, application of the force $F_1$, in excess of the threshold force $F_{TH1}$, to the lap portion 82 of the web 80 draws the end 140B of the strap or web 140 forwardly and away from the seat back frame 30, thereby causing slack in the strap or web 140 to be taken up by the bracket 144. As the bottom end 140B of the strap or web 140 continues to move forward and away from the seat back frame 30 in response to the force $F_1$, the strap or web 140 continues to tighten about the bracket 144, thereby causing it to eventually become taught as illustrated in FIG. 10C. When the strap or web 140 becomes fully taught such that it cannot be further tightened or stretched about the bracket 144, movement of the strap or web 140 ceases and the fully taught strap or web 140 between the plate or bracket 142 and the bracket 144 imparts additional stiffness to the seat back frame 30.

In the embodiment illustrated in FIGS. 10A-10C, the actuator of the seat back stiffening apparatus 50₄, i.e., the component or structure of the seat back stiffening apparatus 50₄ to which the lap portion 82 of the occupant restraint web 80 is coupled and which is responsive to force applied by the lap portion 82 of the web 80 to deploy or activate the seat back stiffening apparatus 50₄, is the strap or web 140. The stiffening component or structure of the seat back stiffening apparatus 50₄ illustrated in FIGS. 10A-10C, i.e., the component or structure which actually adds stiffness to the seat back by extending between and in contact with the bracket 144 attached to the seat mounting base 26 and the seat back frame 30, is also the web or strap 140, and the travel stop, i.e., the component or structure which limits and stops movement of the stiffening component relative to the seat frame, is the bracket 144.

Figure 11C:
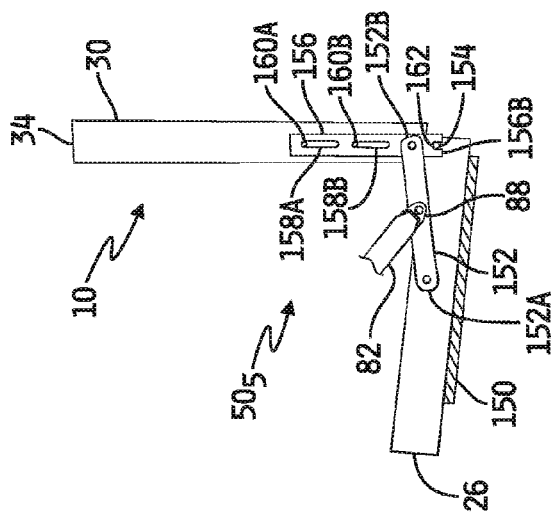
FIG. 11C is yet another simplified side view diagram of the vehicle seat of FIGS. 11A and 11B shown after completion of the crash event illustrated in FIG. 11B.
Figure 11B:
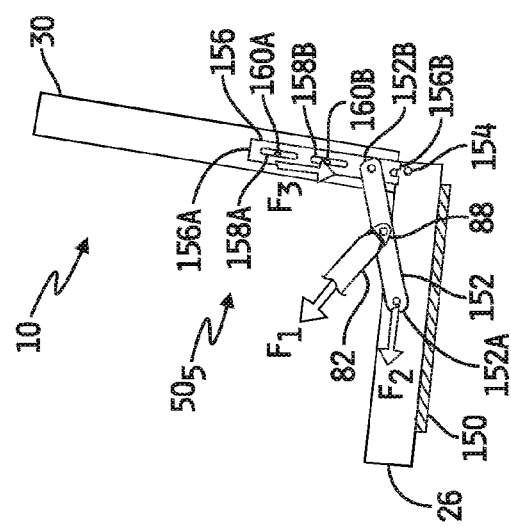
FIG. 11B is another simplified side view diagram of the vehicle seat shown in FIG. 11A illustrating operation of the apparatus during a vehicle crash event.
Figure 11A:
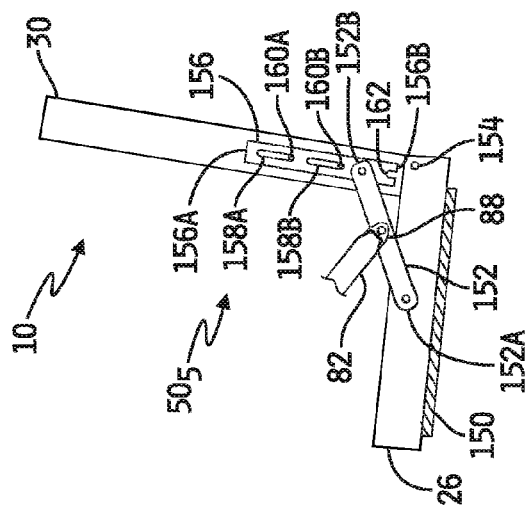
FIG. 11A is a simplified side-view diagram of the vehicle seat illustrated in FIG. 1 including yet a further embodiment of an occupant restraint actuated apparatus for dynamically stiffening the vehicle seat back.

Referring now to FIGS. 11A-11C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus 50₅ coupled to the seat 10. Although the vehicle seat 10 and the occupant restraint harness 78 are illustrated in FIGS. 11A-11C in simplified form, it will be understood that the seat 10 and the occupant restraint harness 78 are both structurally and functionally as illustrated herein and described above with one exception to the seat 10, and that otherwise only the seat back stiffening apparatus 50₅ is different. FIG. 11A illustratively shows the vehicle seat 10 with the seat back stiffening apparatus 50₅ in its normal, unactuated or non-deployed state, FIG. 11B shows the vehicle seat 10 during a crash event as described above and FIG. 11C shows the vehicle seat 10 at or near the end of the crash event.

In the illustrated embodiment, the seat mounting base 26 or portion thereof, or in some embodiments at least the cushion 72 of the seat bottom 22 or an additional structure disposed between the seat mounting base 26 and the seat cushion 72, is mounted to or otherwise carried by a linear slide 150 whereby the seat mounting base 26 or portion thereof, or at least the seat cushion 72 or other structure disposed between the seat mounting base 26 and the seat cushion 72, is linearly slidable forward and rearward relative to the seat back frame 30. The seat back stiffening apparatus 50₅ illustratively includes an elongated bracket 152 having a top end 152B and a bottom end 152A opposite the top end 152B. The bracket 152 is pivotably attached to the seat mounting base 26 at or near the bottom end 152A and is pivotably attached to slidable bracket 156 that is slidably mounted to the seat back frame 30 along one side of the seat back. The plate or bracket 88 to which the lap portion 82 of the web 80 is affixed is itself illustratively attached to a middle portion of the bracket 152 between the bottom and top ends 152A, 152B thereof, e.g., at or near the bight 23 of the seat 10.

The bracket 156 illustratively defines a number of slots, e.g., 158A, 158B, therethrough between a top end 156A and bottom end 156B thereof, each sized to receive one of a corresponding number of pins, e.g., 160A, 160B therein, wherein the pins, e.g., 160A, 160B, are affixed to the seat back frame 30. The bracket 156 is vertically slidable relative to the pins, e.g., 160A, 160B, and thus relative to the seat back frame 30. The bottom end 156B of the bracket 156 defines a notch 162 sized to receive therein a pin 154 mounted to the seat mounting base 26. In the unactuated state of the apparatus $50_5$, the pins, e.g., 160A, 160B, are located in the bottom ends of the slots 158A, 158B.

As illustrated in FIGS. 11B and 11O, application of the force $F_1$, in excess of the threshold force $F_{TH1}$, to the lap portion 82 of the web 80 draws the seat mounting base 26 or portion thereof, or in some embodiments at least the cushion 72 of the seat bottom 22 or an additional structure disposed between the seat mounting base 26 and the seat cushion 72, forwardly and away from the seat back frame 30 on the linear slide 150, thereby causing the bracket 152 to pivot about each end 152A, 152B and, in turn, drawing the bracket 156 downwardly along the side of the seat back frame 30. As the pivoting bracket 152 continues to draw the bracket 156 downwardly in response to the force $F_1$, the notch 162 defined in the bottom end 156B of elongated bracket 156 aligns with and engages the pin 154, thereby stopping the vertical movement of the bracket 156 and coupling the bracket 156 between the seat back frame 30 and the seat mounting base 26, and further thereby imparting additional stiffness to the seat back frame 30. In some alternate embodiments, the seat back stiffening apparatus $50_5$ may be designed such that the bracket 152 pivots upwardly, and/or such that the bracket 156 is movably mounted to the seat mounting base 26 and moves upwardly to engage the pin 154 or other engagement mechanism mounted to the seat back frame 30. In other alternate embodiments, the pin 154 or other engagement mechanism may be configured to move upwardly from the seat mounting base 26 into engagement with the bracket 156 mounted to the seat back frame 30 or downwardly from the seat back frame 30 into engagement with the bracket 156 mounted to the seat mounting base 26.

In the embodiment illustrated in FIGS. 11A-11O, the actuator of the seat back stiffening apparatus $50_5$, i.e., the component or structure of the seat back stiffening apparatus $50_5$ to which the lap portion 82 of the occupant restraint web 80 is coupled and which is responsive to force applied by the lap portion 82 of the web 80 to deploy or activate the seat back stiffening apparatus $50_5$, is the bracket 152. The stiffening component or structure of the seat back stiffening apparatus $50_5$ illustrated in FIGS. 11A-11O, i.e., the component or structure which actually adds stiffness to the seat back by extending between and in contact with the pin 154 mounted to the seat mounting base 26 and the seat back frame 30, is the bracket 156, and the travel stop, i.e., the component or structure which limits and stops movement of the stiffening component relative to the seat frame, is the pin 154 mounted to the seat mounting base 26.

Referring now to FIGS. 12A-12F, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus $50_6$ coupled to the seat 10. Although the vehicle seat 10 and the occupant restraint harness 78 are illustrated in FIGS. 12A-12F in simplified form, it will be understood that the seat 10 and the occupant restraint harness 78 are both structurally and functionally as illustrated herein and described above, and that only the seat back stiffening apparatus $50_6$ is different. FIGS. 12A and 12B illustratively show the vehicle seat 10 and a portion of the seat back stiffening apparatus $50_6$ with the seat back stiffening apparatus $50_6$ in its normal, unactuated or non-deployed state, FIGS. 12C and 12D show the vehicle seat 10 and the portion of the seat back stiffening apparatus $50_6$ during a crash event as described above and FIGS. 12E and 12F show the vehicle seat 10 and the portion of the seat back stiffening apparatus $50_6$ at or near the end of the crash event.

In the illustrated embodiment, the seat back stiffening apparatus $50_6$ illustratively includes an elongated, L-shaped bracket 170, having an elongated side 170A and an elongated back 170B, affixed near its bottom end to the side and/or rear respectively of the seat mounting base 26 but not to the seat back frame 30. A pin 176 is movably attached to and carried by the seat back frame 30, and a shaft 176A of the pin 176 is attached to one end 172B of a tether, web or cable 172. The opposite end 172A of the tether, web or cable 172 is attached to the plate or bracket 88 to which the lap portion 82 of the web 80 is affixed, e.g., at or near the bight 23 of the seat 10, and between the two ends 172A, 172B the tether, web or cable 172 passes about a guide 174 positioned adjacent to or near the bottom end of the bracket 170. In the unactuated state of the apparatus $50_6$, a head 176B attached to the shaft 176A of the pin 176 passes through an enlarged portion 178A of a linear guide slot 178 defined through back side 170B of the bracket 170 adjacent to or near the top end thereof. The enlarged portion 178A is illustratively sized such that the head 176B of the pin 176 can freely pass therethrough in a substantially horizontal direction, e.g., when the seat back stiffening apparatus $50_6$ is unactuated or non-deployed and a forward force is applied to the rear portion of the seat back 24 or seat back frame 30. In alternate embodiments, the bracket 170 may be affixed at or near one end thereof to the seat back frame 20, and the pin 176 may be movably mounted to and carried by the seat bottom 24, e.g., the seat mounting base 26.

As illustrated in FIGS. 12C-12F, application of the force $F_1$, in excess of the threshold force $F_{TH1}$, to the lap portion 82 of the web 80 draws the tether, web or cable 172 forwardly and away from the seat back frame 30, thereby drawing the shaft 176A of the pin 176 downwardly toward and into a reduced width portion 178B of the guide slot 178 through which the head 178B cannot pass in the horizontal direction. With the head 176B of the pin 176 located within the reduced width portion 178B of the guide slot 178, the bracket 170 is coupled to and between the seat mounting base 26 and the seat back frame 30, thereby imparting additional stiffness to the seat back frame 30. As the tether, web or cable 172 continues to be drawn away from the seat back frame 30 in response to the force $F_1$, the shaft 176A of the pin 176 reaches the end of the reduced width portion 178B of the guide slot 178, thereby stopping movement of the pin 176 relative to the seat back frame 30 and the bracket 170.

In the embodiment illustrated in FIGS. 12A-12F, the actuator of the seat back stiffening apparatus $50_6$, i.e., the component or structure of the seat back stiffening apparatus $50_6$ to which the lap portion 82 of the occupant restraint web 80 is coupled and which is responsive to force applied by the lap portion 82 of the web 80 to deploy or activate the seat back stiffening apparatus 50$_6$, is the tether, web or cable 172. The stiffening component or structure of the seat back stiffening apparatus 50$_6$ illustrated in FIGS. 12A-12F, i.e., the component or structure which actually adds stiffness to the seat back by extending between and in contact with the seat mounting base 26 and the seat back frame 30, is the bracket 170, and the travel stop, i.e., the component or structure which limits and stops movement of the pin 176 relative to the bracket 170, is also the end of the reduced width portion 178B of the guide slot 178 defined through the bracket 170.

Figure 13C:
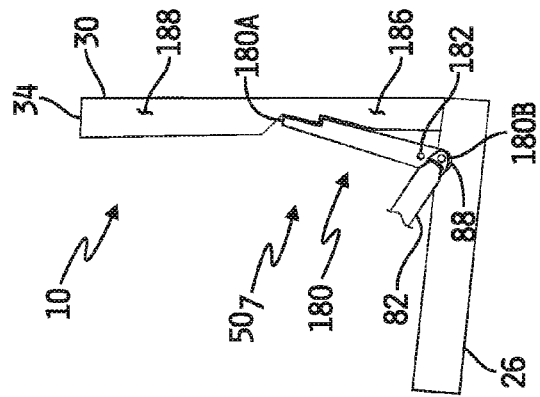
FIG. 13C is yet another simplified side view diagram of the vehicle seat of FIGS. 13A and 13B shown after completion of the crash event illustrated in FIG. 13B.
Figure 13B:
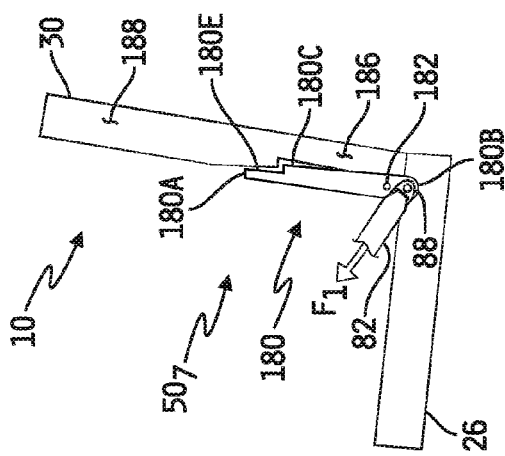
FIG. 13B is another simplified side view diagram of the vehicle seat shown in FIG. 13A illustrating operation of the apparatus during a vehicle crash event.
Figure 13A:
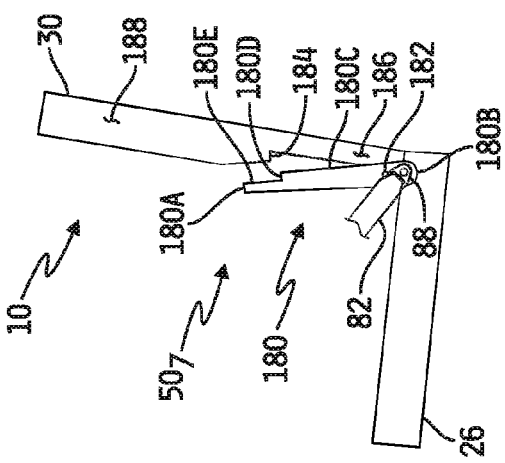
FIG. 13A is a simplified side-view diagram of the vehicle seat illustrated in FIG. 1 including another embodiment of an occupant restraint actuated apparatus for dynamically stiffening the vehicle seat back.

Referring now to FIGS. 13A-13C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus 50$_7$ coupled to the seat 10. Although the vehicle seat 10 and the occupant restraint harness 78 are illustrated in FIGS. 13A-13C in simplified form, it will be understood that the seat 10 and the occupant restraint harness 78 are both structurally and functionally as illustrated herein and described above, and that only the seat back stiffening apparatus 50$_7$ is different. FIG. 13A illustratively shows the vehicle seat 10 with the seat back stiffening apparatus 50$_7$ in its normal, unactuated or non-deployed state, FIG. 13B shows the vehicle seat 10 during a crash event as described above and FIG. 13C shows the vehicle seat 10 at or near the end of the crash event.

In the illustrated embodiment, the seat back stiffening apparatus 50$_7$ includes an elongated bracket 180 having a top end 180A and a bottom end 180B opposite the top end 180A. The bracket 180 is pivotably attached to the seat back frame 30, e.g., via a suitable pin or conventional fixation member 182. In alternate embodiments, the bracket 180 may be pivotably attached to the seat bottom 24, e.g., to the seat mounting base 26. At or near the top 180A, the bracket 180 defines a seat back frame engagement profile and the seat back frame 30 likewise defines a complementarily configured bracket engagement profile, and the two profiles engage each other when the seat back stiffening apparatus 50$_7$ is actuated or deployed. In the illustrated embodiment, a lower portion 180C of the bracket 180 has a first width or thickness and an upper portion 180E has a second width or thickness that is less than the first width or thickness 180C, and the bracket 180 illustratively defines a step 180D between the upper 180E and lower 180C portions.

The seat back frame 30 similarly has a lower portion 186 of a first width or thickness and an upper portion 188 of a second width or thickness that is greater than the first width or thickness 186, and the seat back frame 30 illustratively defines a step 184 between the lower 186 and upper 188 portions. In the unactuated state of the apparatus 50$_7$, the bracket 180 is pivoted about the pin 182 outwardly and away from the seat back frame 30 such that the top 180A of the bracket 180 is spaced apart from the seat back frame 180. The plate or bracket 88 to which the lap portion 82 of the web 80 is affixed is itself illustratively attached to the bracket 180 at or near the bottom end 180B thereof.

As illustrated in FIGS. 13B and 13C, application of the force $F_1$, in excess of the threshold force $F_{TH1}$, to the lap portion 82 of the web 80 draws the end portion 180B of the bracket 180 forwardly and away from the seat back frame 30, thereby causing the bracket 180 to pivot about the pin or fixation member 182 such that the top portion 180A of the bracket 180 moves toward and eventually into engagement with the seat back frame 130 such that the seat back frame engagement profile 180C, 180D, 180E of the bracket 180 engages the bracket engagement profile 184, 186, 188 of the seat back frame 130. As the bottom end 180B of the bracket 180 continues to pivot about the pin 126 in response to the force $F_1$, the seat back frame engagement profile 180C, 180D, 18E of the bracket 180 presses into bracket engagement profile 184, 186, 188 of the seat back frame 30 the strap or web 130, thereby stopping movement of the bracket 180 and coupling the bracket 180 between the seat mounting base 26 (or a lower portion of the seat back frame 30) and a middle or upper portion of the seat back frame and imparting additional stiffness to the seat back frame 30.

In the embodiment illustrated in FIGS. 13A-13C, the actuator of the seat back stiffening apparatus 50$_7$, i.e., the component or structure of the seat back stiffening apparatus 50$_7$ to which the lap portion 82 of the occupant restraint web 80 is coupled and which is responsive to force applied by the lap portion 82 of the web 80 to deploy or activate the seat back stiffening apparatus 50$_7$, is the bracket 180. The stiffening component or structure of the seat back stiffening apparatus 50$_7$ illustrated in FIGS. 13A-13C, i.e., the component or structure which actually adds stiffness to the seat back by extending between and in contact with the seat mounting base 26 and the seat back frame 30, is also the bracket 180, and the travel stop, i.e., the component or structure which limits and stops movement of the stiffening component relative to the seat frame, is the seat back frame 30.

Referring now to FIGS. 14A-14F, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus 50$_8$ coupled to the seat 10. Although the vehicle seat 10 and the occupant restraint harness 78 are illustrated in FIGS. 14A-14F in simplified form, it will be understood that the seat 10 and the occupant restraint harness 78 are both structurally and functionally as illustrated herein and described above, and that only the seat back stiffening apparatus 50$_8$ is different. FIGS. 14A and 14B illustratively show the vehicle seat 10 and a portion of the seat back stiffening apparatus 50$_8$ with the seat back stiffening apparatus 50$_8$ in its normal, unactuated or non-deployed state, FIGS. 14C and 14D show the vehicle seat 10 and the portion of the seat back stiffening apparatus 50$_8$ during a crash event as described above and FIGS. 14E and 14F show the vehicle seat 10 and the portion of the seat back stiffening apparatus 50$_8$ at or near the end of the crash event.

In the illustrated embodiment, the seat back stiffening apparatus 50$_8$ illustratively includes a conventional force sensing mechanism 190, such as a force sensor or switch, attached or otherwise coupled to the plate or bracket 88 to which the lap portion 82 of the web 80 is affixed or to the lap portion 82 or other portion of the web 80, e.g., at or near the bight 23 of the seat 10. The force sensing mechanism 190 may illustratively be or include any one or more of an electrical, mechanical and/or hydraulic device, apparatus or system. The bracket 88 and/or force sensing mechanism 190 is/are coupled to an actuator 192 via a tether or cable 194, e.g., at or near the bight 23 of the seat 10. The actuator 192 is conventional and may illustratively be or include any one or more of an electrical, mechanical and/or hydraulic actuator valve or other such device or apparatus, and the tether or cable 194 may likewise be or include any one or more of an electrical, mechanical and/or hydraulic link.

The actuator 192 is operatively coupled to an elongated cylinder or chamber 196 which carries a piston 198 extendable from a bottom end thereof positioned adjacent to a pin or other protrusion 200 attached or otherwise affixed to the seat mounting base 26. As most clearly shown in FIG. 14B, the exposed end of the piston 198 of illustratively defines a notch or slot 202 sized and configured to receive and engage the pin 200. The cylinder or chamber 196 is conventional and may illustratively be an electrically, mechanically and/or hydraulically actuated device.

In the unactuated state of the apparatus $50_8$, as illustrated in FIGS. 14A and 14B, the piston 198 is at least partially retracted within the cylinder 196 and is, in any case, spaced apart from the pin 200. As illustrated in FIGS. 14C and 14D, application of the force $F_1$, in excess of the threshold force $F_{TH1}$, to the lap portion 82 of the web 80 is sensed by the force sensing mechanism 190 which signals the actuator 192 to actuate the cylinder 196. Actuation of the cylinder 196 causes the cylinder 196 to eject or otherwise extend the piston 198 downwardly therefrom in the direction 204 toward the pin 200. As illustrated in FIGS. 14E and 14F, the notch 202 defined in the exposed end of the moving piston 198 engages the pin 200, thereby stopping movement of the piston 198 and coupling the cylinder 196 and piston 198 to and between the seat mounting base 26 and the seat back frame 30 and imparting additional stiffness to the seat back frame 30. In some alternate embodiments, the seat back stiffening apparatus $50_8$ may be designed such that the cylinder 196 and piston 198 are mounted to the seat mounting base 26 so that the piston 198 moves upwardly to engage the pin 200 or other engagement mechanism mounted to the seat back frame 30.

In the embodiment illustrated in FIGS. 14A-14F, the actuator of the seat back stiffening apparatus $50_8$, i.e., the component or structure of the seat back stiffening apparatus $50_8$ to which the lap portion 82 of the occupant restraint web 80 is coupled and which is responsive to force applied by the lap portion 82 of the web 80 to deploy or activate the seat back stiffening apparatus $50_8$, is the combination of the force sensing mechanism 190 and the actuator 192. The stiffening component or structure of the seat back stiffening apparatus $50_8$ illustrated in FIGS. 14A-14F, i.e., the component or structure which actually adds stiffness to the seat back by extending between and in contact with the seat mounting base 26 and the seat back frame 30, is the cylinder 196 and piston 198, and the travel stop, i.e., the component or structure which limits and stops movement of the piston 198 relative to the cylinder 196, is the pin 200.

Figure 15C:
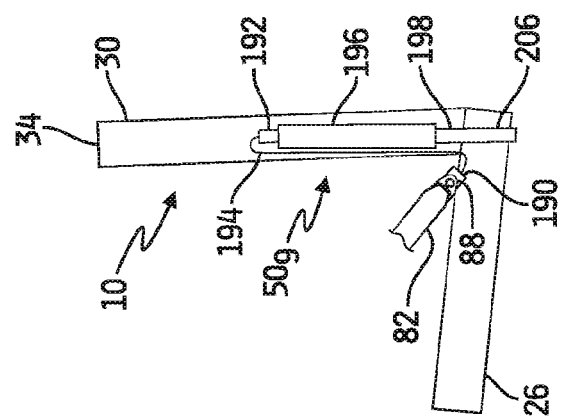
FIG. 15C is yet another simplified side view diagram of the vehicle seat of FIGS. 15A and 15B shown after completion of the crash event illustrated in FIG. 15B.
Figure 15B:
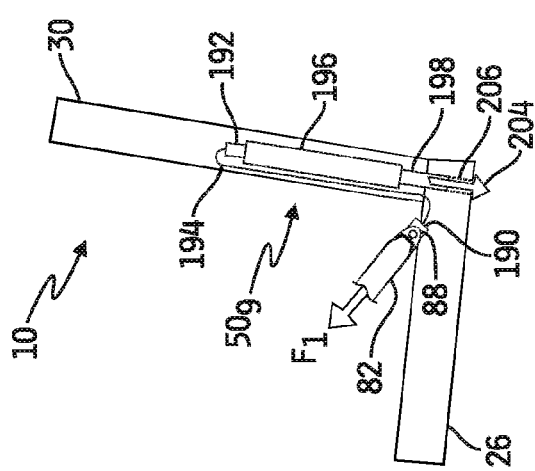
FIG. 15B is another simplified side view diagram of the vehicle seat shown in FIG. 15A illustrating operation of the apparatus during a vehicle crash event.
Figure 15A:
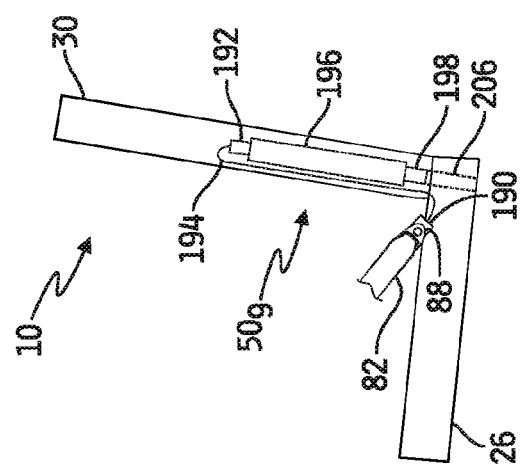
FIG. 15A is a simplified side-view diagram of the vehicle seat illustrated in FIG. 1 including still another embodiment of an occupant restraint actuated apparatus for dynamically stiffening the vehicle seat back.

Referring now to FIGS. 15A-15C, simplified side-view diagrams are shown of the vehicle seat 10 illustrated in FIG. 1 with only part of the lap portion 82 of the web 80 of the occupant restraint harness 78 operatively attached to another embodiment of an occupant restraint actuated seat back stiffening apparatus $50_9$ coupled to the seat 10. Although the vehicle seat 10 and the occupant restraint harness 78 are illustrated in FIGS. 15A-15C in simplified form, it will be understood that the seat 10 and the occupant restraint harness 78 are both structurally and functionally as illustrated herein and described above, and that only the seat back stiffening apparatus $50_9$ is different. FIG. 15A illustratively shows the vehicle seat 10 and the seat back stiffening apparatus $50_9$ with the seat back stiffening apparatus $50_9$ in its normal, unactuated or non-deployed state, FIG. 15C shows the vehicle seat 10 and the seat back stiffening apparatus $50_9$ during a crash event as described above and FIG. 15C shows the vehicle seat 10 and the portion of the seat back stiffening apparatus $50_9$ at or near the end of the crash event. In some alternate embodiments, the seat back stiffening apparatus $50_9$ may be designed such that the cylinder 196 and piston 198 are mounted to the seat mounting base 26 so that the piston 198 moves upwardly to engage the bore or slot 206 defined through or into the seat back frame 30.

In the illustrated embodiment, the seat back stiffening apparatus $50_9$ is identical in many respects to the seat back stiffening apparatus $50_8$, and like numbers are therefore used to identify like components. The seat back stiffening apparatus $50_9$ differs from the seat back stiffening apparatus $50_8$ in that a bore 206 defined through or into the seat mounting base 26 replaces the pin 200. In the unactuated state of the apparatus $50_9$, as illustrated in FIG. 15A, the piston 198 is at least partially retracted within the cylinder 196 and is, in any case, spaced apart from the pin bore 206. As illustrated in FIG. 15B, application of the force F1, in excess of the threshold force $F_{TH1}$, to the lap portion 82 of the web 80 is sensed by the force sensing mechanism 190 which signals the actuator 192 to actuate the cylinder 196. Actuation of the cylinder 196 causes the cylinder 196 to eject or otherwise extend the piston 198 downwardly therefrom in the direction 204 toward, and into, the bore 206. As illustrated in FIG. 15C, travel of the piston 198 stops when it reaches the end of its extension from the cylinder 196. Extension of the piston 198 into the bore 206 couples the cylinder 196 and piston 198 to and between the seat mounting base 26 and the seat back frame 30, thereby imparting additional stiffness to the seat back frame 30.

In the embodiment illustrated in FIGS. 15A-15C, the actuator of the seat back stiffening apparatus 509, i.e., the component or structure of the seat back stiffening apparatus 509 to which the lap portion 82 of the occupant restraint web 80 is coupled and which is responsive to force applied by the lap portion 82 of the web 80 to deploy or activate the seat back stiffening apparatus 509, is the combination of the force sensing mechanism 190 and the actuator 192. The stiffening component or structure of the seat back stiffening apparatus 509 illustrated in FIGS. 15A-15C, i.e., the component or structure which actually adds stiffness to the seat back by extending between and in contact with the seat mounting base 26 and the seat back frame 30, is the cylinder 196 and piston 198, and the travel stop, i.e., the component or structure which limits and stops movement of the piston 198 relative to the cylinder 196, is the piston 198.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while several embodiments described herein and illustrated in the attached figures describe and show only a single seat back stiffening apparatus mounted to the vehicle seat, it will be understood that any of the embodiments described herein may include two or more such seat back stiffening apparatus mounted to the vehicle seat, one example of which is illustrated and described with respect to FIGS. 1, 2A and 6C. As another example, any of the moving parts in any of the embodiments described above and illustrated in the attached figures may alternatively be made to move linearly, non-linearly and/or rotationally in any direction and/or relative to any plane. As yet another example, in any of the embodiments described above and illustrated in the attached figures, the actuating mechanism that activates the seat back stiffening apparatus may be triggered by occupant loading on the seat back 24 at the shoulder web portion 84 of the occupant restraint web 80, i.e., at or near the top 34 of the seat back 24, rather than at the lap portion 82 of the occupant restraint web 80, i.e., at or near the bight 23 of the seat 10. As yet another example, in any of the embodiments described above and illustrated in the attached figures, the actuating mechanism that activates the seat back stiffening apparatus, whether triggered by forward occupant loading at the top 34 of the seat back 24 or at the bight 23, may be separate and independent from the seat back stiffening structure. As still a further example, those skilled in the art will recognize that components comprising the various example embodiments described above and illustrated in the attached figures may be implemented in others of the illustrated and described embodiments, and it will be understood that such implementations are intended to fall within the scope of this disclosure. As a specific example of this, the seat back stiffening member in any particular embodiment may be supplemented and/or replaced by one or more other seat back stiffening members illustrated and described in one or more other embodiments. As another specific example, the seat back stiffening apparatus actuator in any particular embodiment may be supplemented and/or replaced by one or more other seat back stiffening apparatus actuators illustrated and described in one or more other embodiments. As still another specific example, the travel stop in any particular embodiment may be supplemented and/or replaced by one or more other travel stops illustrated and described in one or more other embodiments

What is claimed is:

1. An apparatus for dynamically stiffening a vehicle seat back, the apparatus comprising:
    a vehicle seat including a seat bottom mountable within a vehicle, a seat back extending upwardly away from the seat bottom, and a bight defined at a forward-facing interface between the seat bottom and the seat back,
    an occupant restraint harness coupled to the vehicle seat and engaging a top end of the seat back, the occupant restraint harness configured to restrain an occupant of the vehicle seat, and
    a seat back stiffening apparatus having a seat back stiffening member and an actuator coupled to the occupant restraint harness adjacent to or near the bight of the vehicle seat, the actuator responsive to a first force applied thereto by the occupant restraint harness in excess of a first threshold force to deploy the seat back stiffening member to couple to and between the seat bottom and the seat back to add stiffness to the seat back frame.

2. The apparatus of claim 1, wherein the seat back comprises a seat back frame supporting the seat back, and the seat back stiffening member comprises an elongated bracket having a first end and a second end opposite the first end, the elongated bracket mounted to one of the seat back frame and the seat bottom at or near the first end thereof with the second end of the bracket normally positioned adjacent to the seat back frame,
    and wherein the elongated bracket at or near the second end thereof defines the actuator and is coupled to the occupant restraint harness, the first force in excess of the first threshold force applied by the occupant restraint harness to the bracket at or near the second end thereof drawing the second end of the bracket forwardly away from the seat back frame,
    and wherein a second force in excess of a second threshold force applied by the occupant restraint harness to the top end of the seat back deforms the seat back frame and forces the second end of the bracket into contact with the other of the seat back and the seat bottom.

3. The apparatus of claim 2, further comprising a travel stop member to stop outward movement of the second end of the elongated bracket away from the seat back frame, in response to the first force in excess of the first threshold force applied thereto by the occupant restraint harness, after the second end of the elongated bracket is spaced apart from the seat back frame.

4. The apparatus of claim 3, wherein the travel stop member comprises a control arm having a first end coupled to the elongated bracket at or near the second end thereof and a second end coupled to the seat back frame, the control arm extending from a first position with the second end of the elongated bracket positioned adjacent to the seat back frame to a second position with the second end of the bracket spaced apart from the seat back frame.

5. The apparatus of claim 4, wherein the control arm deforms between the first and second positions thereof in response to the first force in excess of the first threshold force applied by the occupant restraint harness to the elongated bracket at or near the second end thereof.

6. The apparatus of claim 3, wherein the travel stop member comprises a notch defined in a forwardly-facing surface of the elongated bracket between the first and second ends thereof, the outward movement of the second end of the elongated bracket away from the seat back frame stopping as the notch closes in response to outward movement of the bracket.

7. The apparatus of claim 6, wherein the elongated bracket deforms to close as the second end of the elongated bracket moves outwardly away from the seat back frame in response to the first force in excess of the first threshold force applied by the occupant restraint harness to the elongated bracket at or near the second end thereof.

8. The apparatus of claim 3, wherein the travel stop member comprises a shaft extending along or through the seat back frame, the shaft having a first end coupled to the elongated bracket at or near the second end thereof and a second end defining a head, the shaft extending from a first position with the second end of the elongated bracket positioned adjacent to the seat back frame and the head of the shaft spaced apart from the seat back frame to a second position with the second end of the bracket spaced apart from the seat back frame and the head of the shaft in contact with the seat back frame.

9. The apparatus of claim 8, further comprising a spring disposed between the head of the shaft and the seat back frame.

10. The apparatus of claim 1, wherein the seat back comprises a seat back frame supporting the seat back, and the seat back stiffening member comprises an elongated bracket having a first end and a second end opposite the first end, the elongated bracket mounted to one of the seat bottom and the seat back frame at or near the first end of the bracket with the second end of the bracket positioned adjacent to the seat back frame, the elongated bracket defining a linear guide slot therethrough at or near the second end thereof, the linear guide slot defining an enlarged opening transitioning to a reduced width portion,
    and wherein the actuator comprises a headed shaft movably mounted to the other of the seat bottom and the seat back frame, the headed shaft having a shaft portion coupled to the occupant restraint harness and sized to pass through both the enlarged opening and the reduced width portion of the guide slot and a head portion sized to pass through the enlarged opening but not through the reduced width portion of the guide slot, the head portion of the headed shaft normally extending through the enlarged opening of the guide slot, the first force in excess of the first threshold force applied by the occupant restraint harness to the shaft portion of the headed shaft drawing the head portion into the reduced width portion of the guide slot to thereby couple the elongated bracket to and between the seat bottom and the seat back frame.

11. The apparatus of claim 1, wherein the seat back comprises a seat back frame supporting the seat back, and the seat back stiffening member comprises an elongated flexible member having a first end coupled to a rearwardly facing portion of the seat back frame and a second end opposite the first end defining the actuator coupled to the occupant restraint harness, and wherein the seat back stiffening apparatus further comprises a bracket mounted to the seat bottom in contact with the flexible member between the first and second ends thereof, the elongated flexible member sized to be normally slack between the first and second ends thereof, the first force in excess of the first threshold force applied by the occupant restraint harness to the first end of the elongated flexible member drawing the elongated flexible member taught between the seat back frame and the bracket to thereby add stiffness to the seat back.

12. The apparatus of claim 1, wherein the seat back comprises a seat back frame supporting the seat back, and the seat back stiffening member comprises an elongated flexible member having a first end coupled to a rearwardly facing portion of the seat back frame and a second end opposite the first end coupled to the seat bottom, and wherein the actuator comprises an elongated bracket having a first end and a second end opposite the first end, the occupant restraint harness coupled to the elongated bracket at or near the first end thereof and the second end of the elongated bracket in contact with the flexible member between the first and second ends thereof the elongated bracket pivotably mounted between the first and second ends thereof to the seat back frame or the seat bottom, the elongated flexible member sized to be normally slack between the first and second ends thereof, the first force in excess of the first threshold force applied by the occupant restraint harness to the elongated bracket at or near the first end thereof pivoting the elongated bracket to force the second end of the elongated bracket into the elongated flexible member to drawn the elongated flexible member taught between the seat back frame and the seat bottom to thereby add stiffness to the seat back.

13. The apparatus of claim 1, wherein the seat back comprises a seat back frame supporting the seat back, and the seat back stiffening member comprises an elongated bracket having a first end and a second end opposite the first end, the elongated bracket pivotably mounted to the seat back frame or the seat bottom between first and second ends thereof with the first end of the bracket normally spaced apart forwardly away from the seat back frame, and wherein the elongated bracket at or near the second end thereof defines the actuator and is coupled to the occupant restraint harness, the first force in excess of the first threshold force applied by the occupant restraint harness to the bracket at or near the second end thereof pivoting the elongated bracket to force the first end of the elongated bracket rearwardly into contact with the seat back frame to thereby add stiffness to the seat back.

14. The apparatus of claim 1, wherein the seat back comprises a seat back frame supporting the seat back, and the seat bottom is slidably mounted to a seat mounting base mountable within the vehicle, and wherein the seat back stiffening member comprises a first elongated bracket slidably mounted to one of the seat back frame and the seat bottom, and a pin coupled to the other of the seat back frame and the seat bottom, one end of the first elongated bracket facing the pin and defining a notch sized to receive the pin therein, and wherein the actuator comprises a second elongated bracket having a first end pivotably mounted to the seat bottom and a second end, opposite the first end, pivotably mounted to the first elongated bracket, the second elongated bracket coupled between the first and second ends thereof to the occupant restraint harness, the first force in excess of the first threshold force applied by the occupant restraint harness to the second elongated bracket to draw the seat bottom forwardly relative to the seat mounting base thereby pivoting the first elongated bracket to force the notch defined in the one end of the first elongated bracket into engagement with the pin to thereby couple the first elongated bracket to and between the seat back frame and the seat bottom to thereby add stiffness to the seat back.

15. The apparatus of claim 1, wherein the seat back comprises a seat back frame supporting the seat back, and the seat back stiffening member comprises a chamber mounted to one of the seat back frame and the seat bottom, and a pin coupled to the other of the seat back frame and the seat bottom, the chamber carrying a movable piston having an exposed end defining a notch sized to receive the pin therein, and wherein the actuator comprises a force sensor coupled to the occupant restraint harness and a piston actuator communicatively coupled to the force sensor, the force sensor responsive to the first force in excess of the first threshold force applied thereto by the occupant restraint harness to activate the piston actuator to cause the piston to extend from the chamber and engage the notch with the pin to thereby couple the chamber and piston carried by the chamber to and between the seat back frame and the seat bottom to thereby add stiffness to the seat back.

16. The apparatus of claim 1, wherein the seat back comprises a seat back frame supporting the seat back, and the seat back stiffening member comprises a chamber mounted to one of the seat back frame and the seat bottom, and a bore defined in the other of the seat back frame and the seat bottom, the chamber carrying a movable piston having an exposed aligned with the bore, and wherein the actuator comprises a force sensor coupled to the occupant restraint harness and a piston actuator communicatively coupled to the force sensor, the force sensor responsive to the first force in excess of the first threshold force applied thereto by the occupant restraint harness to activate the piston actuator to cause the piston to extend from the chamber and into the bore to thereby couple the chamber and piston carried by the chamber to and between the seat back frame and the seat bottom to thereby add stiffness to the seat back.

17. An apparatus for dynamically stiffening a vehicle seat back, the apparatus comprising:

a vehicle seat including a seat bottom mountable within a vehicle and a seat back extending upwardly away from the seat bottom, the seat back including a seat back frame supporting the seat back, an occupant restraint harness coupled to the vehicle seat and engaging a top end of the seat back, the occupant restraint harness configured to restrain an occupant of the vehicle seat, and an elongated bracket having a first end and a second end opposite the first end, the elongated bracket mounted to one of the seat back frame and the seat bottom at or near the first end thereof with the second end of the bracket normally positioned adjacent to the seat back frame, the occupant restraint harness coupled to the elongated bracket at or near the second end thereof, wherein a first force in excess of the first threshold force applied by the occupant restraint harness to the bracket at or near the second end thereof draws the second end of the bracket forwardly away from the seat back frame, and a second force in excess of a second threshold force applied by the occupant restraint harness to the top end of the seat back deforms the seat back frame to force the second end of the bracket into contact with the other of the seat back and the seat bottom to couple the elongated bracket to and between the seat bottom and the seat back and thereby add stiffness to the seat back frame.

18. The apparatus of claim 17, further comprising a travel stop member to stop outward movement of the second end of the elongated bracket away from the seat back frame, in response to the first force in excess of the first threshold force applied thereto by the occupant restraint harness, after the second end of the elongated bracket is spaced apart from the seat back frame.

19. The apparatus of claim 18, wherein the travel stop member comprises a control arm having a first end coupled to the elongated bracket at or near the second end thereof and a second end coupled to one of the seat back frame and the seat bottom, the control arm extending from a first position with the second end of the elongated bracket positioned adjacent to the seat back frame to a second position with the second end of the bracket spaced apart from the seat back frame.

20. The apparatus of claim 19, wherein the control arm deforms between the first and second positions thereof in response to the first force in excess of the first threshold force applied by the occupant restraint harness to the elongated bracket at or near the second end thereof.

* * * * *